US012458128B2

(12) United States Patent
Allen

(10) Patent No.: US 12,458,128 B2
(45) Date of Patent: Nov. 4, 2025

(54) INFUSED GROOMING APPARATUS

(71) Applicant: Alycia Aileen Allen, Newark, DE (US)

(72) Inventor: Alycia Aileen Allen, Newark, DE (US)

( * ) Notice: Subject to any disclaimer, the term of this patent is extended or adjusted under 35 U.S.C. 154(b) by 767 days.

(21) Appl. No.: 17/749,189

(22) Filed: May 20, 2022

(65) Prior Publication Data

US 2023/0371674 A1 Nov. 23, 2023

(51) Int. Cl.
*A61H 23/00* (2006.01)
*A45D 34/04* (2006.01)
*A61H 23/02* (2006.01)

(52) U.S. Cl.
CPC ........... *A45D 34/042* (2013.01); *A61H 23/02* (2013.01); *A45D 2200/207* (2013.01); *A61H 2201/0153* (2013.01); *A61H 2201/105* (2013.01); *A61H 2205/021* (2013.01)

(58) Field of Classification Search
CPC ...... A45D 34/00; A45D 34/04; A45D 34/042; A45D 2200/207; A45D 40/0075; A61H 2201/105; A61H 2205/021; A61H 7/002; A61H 7/003–005; A61H 23/02; A61H 23/00
See application file for complete search history.

(56) References Cited

U.S. PATENT DOCUMENTS 1,607,674 A * 11/1926 De Shazo .............. A45D 24/28 401/176
2,103,949 A * 12/1937 Koehler ................. A61H 9/005 601/12
5,570,509 A * 11/1996 Killian ................. A45D 29/023 30/28
5,937,865 A 8/1999 Dhaliwal
6,053,177 A * 4/2000 Sofer ................ B05C 17/00596 401/179
7,805,794 B2 * 10/2010 Taggart .................... A46B 5/00 15/186
2009/0214283 A1 * 8/2009 Thiebaut ................ A45D 34/04 53/235

(Continued)

FOREIGN PATENT DOCUMENTS

CN 206507511 U 9/2017
CN 108143073 A 6/2018
DE 3122516 A1 12/1982

*Primary Examiner* — Margaret M Luarca
*Assistant Examiner* — Sarah B Lederer
(74) *Attorney, Agent, or Firm* — Ashok Tankha

(57) ABSTRACT

A grooming apparatus for dispensing a fluid onto a surface, for example, a scalp of a user, is provided. The grooming apparatus includes a top member with a barrel and a plunger that slides in the barrel, a hollow chamber, and a multi-prong attachment. The hollow chamber is in fluid connection with the barrel. The plunger exerts a pressure on a fluid contained in the hollow chamber. The hollow chamber includes multiple tubular members disposed on and projecting outwards from a bottom surface of the hollow chamber. A top surface of the multi-prong attachment includes multiple holes for receiving the tubular members of the hollow chamber. A bottom surface of the multi-prong attachment includes multiple hollow prongs, each extending downwards from one of the holes in the top surface of the multi-prong attachment. The hollow prongs of the multi-prong attachment accommodate the tubular members of the hollow chamber therewithin.

20 Claims, 16 Drawing Sheets

(56) References Cited

U.S. PATENT DOCUMENTS

| | | | | |
|---|---|---|---|---|
| 2011/0314623 | A1* | 12/2011 | Jimenez | A46B 11/0024 15/167.1 |
| 2013/0228136 | A1* | 9/2013 | Lyon | B05B 11/02 222/323 |
| 2018/0325328 | A1* | 11/2018 | Wright | A47K 7/043 |
| 2021/0330053 | A1* | 10/2021 | Noda | A61H 7/003 |
| 2021/0361049 | A1* | 11/2021 | Brown | A45D 44/00 |
| 2022/0218968 | A1* | 7/2022 | Skakoon | A45D 34/04 |

* cited by examiner

INFUSED GROOMING APPARATUS

FIELD OF THE INVENTION

The apparatus disclosed herein, in general, relates to a grooming apparatus. More particularly, the apparatus disclosed herein relates to a hair grooming apparatus that allows a fluid to be selectively dispensed onto a surface, for example, a scalp of a user.

BACKGROUND

Conventional hair grooming apparatuses have a variety of features that meet various needs and requirements. For example, people having different hair types or conditions typically opt for special types of combs or hair grooming apparatuses. Others may use different types of fluids, for example, oils, shampoos, conditioners, etc., depending upon their hair type, condition, and preferences. Typically, such fluids are applied manually, when required, and thereafter various dispensing or grooming apparatuses are used by self-users or hair care professionals for performing different actions, for example, combing, brushing, washing, styling, scalp stimulation, etc., during hair treatments and grooming sessions. There have been advancements in the designs and features of such apparatuses; however, most of these apparatuses lack the ease of use or ergonomics in the context of a self-use scenario. A routinely used hair grooming apparatus may require some special features since such an apparatus will be used daily by users of all age groups. Moreover, the mechanics and the design of such a daily-use hair grooming apparatus require additional considerations as different users prefer different holding positions along with different hand orientation preferences, for example, left hand or right hand preferences.

Some conventional hair grooming apparatuses are used as massage brushes, for example, scalp massage brushes, scalp scrubbers, etc., for enhancing blood circulation in the scalp and/or for relieving stress. Some of these apparatuses are used with fluids, for example, soap, shampoo, etc., to assist in washing and cleaning of the hair, scalp, etc. However, these apparatuses have restrictions in terms of their design and shape, which make them inconvenient for a daily-use scenario. Furthermore, application of fluids either manually or using conventional hair grooming apparatuses is sub-optimal and/or non-uniform due to the different viscosities of various types of fluids, thereby leading to higher maintenance of such apparatuses and unsatisfactory performances. Furthermore, the chemical and physical properties of such fluids limit the options available for materials chosen for the construction of such apparatuses to store and dispense the fluids. Furthermore, there is a need for the material to be of such a type that the apparatus constructed therefrom can be used directly on the scalp or can come in contact with different types of hair without resulting in any damage to the scalp or the hair.

Hence, there is a long-felt but unresolved need for an infused grooming apparatus that combines the above-recited functionalities of a comb, a scalp massager, a scrubber, and a fluid dispenser, while addressing the above-recited problems associated with the related art and optimizing ergonomic use, performance, cost, maintenance, and overall ease for a daily user.

SUMMARY

This summary is provided to introduce a selection of concepts in a simplified form that are further disclosed in the detailed description. This summary is not intended to determine the scope of the claimed subject matter.

The apparatus disclosed herein addresses the above-recited need for an infused grooming apparatus that combines the functionalities of a comb, a scalp massager, a scrubber, and a fluid dispenser, while optimizing ergonomic use, performance, cost, maintenance, and overall ease for a daily user. The grooming apparatus disclosed herein is configured to selectively dispense a fluid, for example, oil, water, shampoo, conditioner, hair serum, hair care products, etc., or any combination thereof, onto a surface, for example, a scalp of a user. In an embodiment, the grooming apparatus comprises a top member, a hollow chamber, and a multi-prong attachment. The top member comprises a barrel and a plunger. The plunger is configured to slide in the barrel. In an embodiment, a shape of the barrel is a teardrop shape. In an embodiment, a cross-section of the plunger taken across a length of the plunger is of a teardrop shape. The hollow chamber is in fluid connection with the barrel of the top member. The hollow chamber is configured to contain a fluid. The fluid comprises, for example, one of oil, water, shampoo, conditioner, hair serum, hair care products, etc., and any combination thereof. The plunger of the top member is configured to exert a pressure on the fluid contained in the hollow chamber. In an embodiment, a bottom surface of the top member comprises a male luer lock connecter in fluid connection with the barrel. Furthermore, a top surface of the hollow chamber comprises a female luer lock connector. The female luer lock connector is in fluid connection with an internal volume defined by the hollow chamber. The male luer lock connecter is configured to engage with the female luer lock connector to attach the top member to the hollow chamber. The hollow chamber comprises multiple tubular members disposed on and projecting outwards from a bottom surface of the hollow chamber.

The multi-prong attachment comprises a top surface and a bottom surface. The top surface of the multi-prong attachment comprises multiple holes configured to receive the tubular members of the hollow chamber. The number of holes in the top surface of the multi-prong attachment corresponds to the number of tubular members projecting from the bottom surface of the hollow chamber. The bottom surface of the multi-prong attachment comprises multiple hollow prongs, each extending downwards from one of the holes in the top surface of the multi-prong attachment. The hollow prongs are configured to accommodate the tubular members therewithin. In an embodiment, each of the hollow prongs comprises screw ridges or threads configured on an outer surface towards a distal end of each hollow prong. The screw ridges on each hollow prong are configured to secure a covering element over each hollow prong and the distal end of each of hollow prong. In an embodiment, a shape of the multi-prong attachment is a teardrop shape. Moreover, in an embodiment, a shape of a tip of each of the hollow prongs of the multi-prong attachment is a teardrop shape. Furthermore, in an embodiment, a cross-section of each of the hollow prongs taken across a length of each of the hollow prongs is of a teardrop shape. In an embodiment, the tubular members and the hollow prongs correspond to pipettes, hypodermic needles, nozzles, syringes, etc.

In an embodiment, the grooming apparatus further comprises a plunger enhancer. The plunger enhancer comprises a first arm and a second arm. The plunger enhancer is configured to convert a downward movement of the first arm and/or the second arm to a downward movement of the plunger for releasing the fluid from the barrel. In an embodiment, the grooming apparatus further comprises a plunger flange coupled to the plunger. The plunger flange comprises a lock-fit groove configured to lock-fit the plunger enhancer. In an embodiment, the first arm of the plunger enhancer comprises a thumb stand disposed at a distal end of the first arm. In an embodiment, a shape of the thumb stand is a teardrop shape. The thumb stand is configured to accommodate a thumb of a user. The thumb stand is configured to transfer a downward pressure applied by the thumb on the thumb stand to the plunger enhancer and in turn to the plunger. In an embodiment, the second arm of the plunger enhancer is slidably coupled to a manual slider at a distal end of the second arm. In an embodiment, the manual slider comprises a predetermined number of slidable positions traversable by the second arm of the plunger enhancer when a downward force acts on the first arm of the plunger enhancer. For example, the manual slider comprises five slidable positions traversable by the second arm of the plunger enhancer when a downward force acts on the first arm of the plunger enhancer.

In an embodiment, a shape of the top member of the grooming apparatus is a flat teardrop shape. In this embodiment, the top member further comprises a pair of handles. Each handle of the pair of handles extends from a trailing end of the top member. A first handle of the pair of handles is disposed diametrically opposite to and away from a second handle of the pair of handles. The top member further comprises a compartment disposed between the pair of handles at the trailing end of the top member. The compartment is configured to house a vibration unit. The trailing end of the top member comprises a switch configured to operate the vibration unit. The vibration unit comprises, for example, a battery-powered vibrator configured to generate vibrations of predetermined intensities. In an embodiment, the grooming apparatus further comprises a holding tray configured to store a fluid. In an embodiment, a shape of the holding tray is a teardrop shape. In an embodiment, the holding tray comprises multiple holes configured on a top surface of the holding tray for receiving the hollow prongs of the multi-prong attachment and facilitating intake of the stored fluid through the hollow prongs.

In another embodiment, the grooming apparatus disclosed herein comprises a first layer, a second layer, and a third layer. The first layer comprises the multi-prong attachment comprising multiple holes on its top surface for receiving multiple tubular members of the hollow chamber, and multiple hollow prongs extending downwards from its bottom surface for accommodating the tubular members therewithin as disclosed above. The second layer comprises the hollow chamber comprising the tubular members as disclosed above. The top surface of the hollow chamber comprises a female luer lock connector in fluid connection with an internal volume defined by the hollow chamber. The third layer comprises the top member comprising the barrel and the plunger as disclosed above. The plunger is configured to exert a pressure on the fluid contained in the hollow chamber. In an embodiment, the bottom surface of the top member comprises a male luer lock connecter in fluid connection with the barrel. The male luer lock connecter is configured to engage with the female luer lock connector on the hollow chamber to attach the top member to the hollow chamber. In an embodiment, the third layer further comprises a plunger enhancer as disclosed above. The grooming apparatus performs scalp stimulation via direct penetration of a fluid being released through the hollow prongs onto the user's scalp

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific structures and components disclosed herein. The description of a structure or a component referenced by a numeral in a drawing is applicable to the description of that structure or component shown by that same numeral in any subsequent drawing herein.

DETAILED DESCRIPTION

Figure 1:
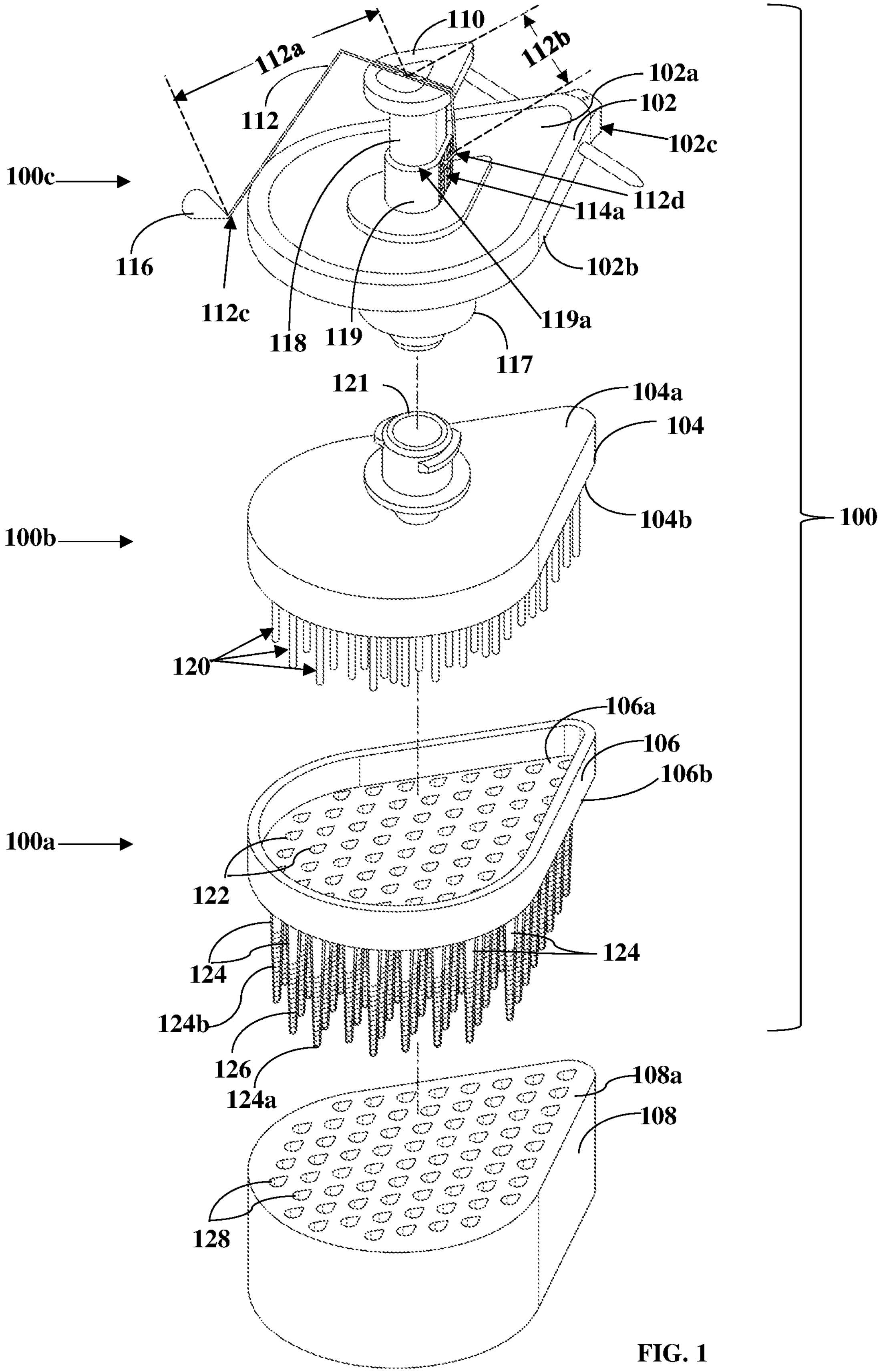
FIG. 1 exemplarily illustrates an exploded, front perspective view of an embodiment of an infused grooming apparatus.

FIG. 1 exemplarily illustrates an exploded, front perspective view of an embodiment of an infused grooming apparatus 100. In an embodiment, the infused grooming apparatus 100 has a teardrop shape for ergonomics and ease of use. For example, the teardrop shape of the infused grooming apparatus 100 provides a comfortable fit when placed in a user's palm regardless of the size of the palm. As used herein, the term "user" refers to an operator of the infused grooming apparatus 100, who uses the infused grooming apparatus 100 for performing grooming actions on themselves or others. As exemplarily illustrated in FIG. 1, the infused grooming apparatus 100 comprises a top member 102, a hollow chamber 104 comprising multiple tubular members 120, and a multi-prong attachment 106 comprising multiple hollow prongs 124. In an embodiment, the top member 102 has a flat teardrop shape as exemplarily illustrated in FIG. 1. The top member 102 is constructed, for example, from a plastic material. The top member 102 comprises a barrel 119 and a plunger 118. The barrel 119 is disposed on a top surface 102*a* of the top member 102. In an embodiment, the barrel 119 is a shallow container made, for example, of plastic, and has a teardrop-shaped cross-section to store a fluid. The plunger 118 is configured to slide in and out of the barrel 119. In an embodiment, a cross-section of the plunger 118 across a length of the plunger 118 is of a teardrop shape.

Figure 4:
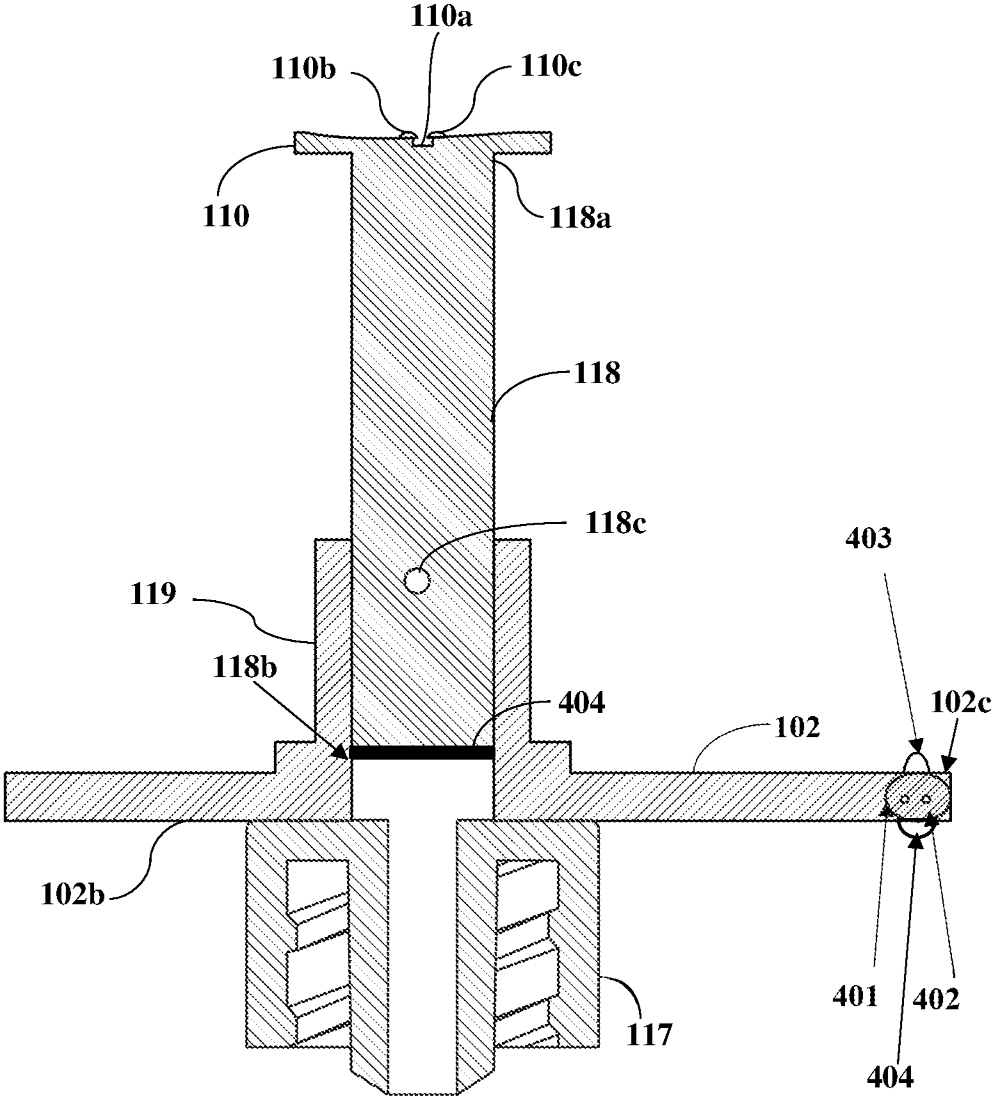
FIG. 4 exemplarily illustrates a right-hand side, cross-sectional view of a top member of an embodiment of the infused grooming apparatus.

In an embodiment, the infused grooming apparatus 100 further comprises a plunger flange 110 coupled to the plunger 118 as exemplarily illustrated in FIG. 1 and FIG. 4. The plunger flange 110 assists a user in pulling the plunger 118 above the barrel 119 to intake a fluid into the barrel 119. Furthermore, the plunger flange 110 bears the load of the user's thumb when the user pushes the plunger 118, forcing the fluid in the barrel 119 into the hollow chamber 104, thereby releasing and dispensing the fluid through the tubular members 120 of the hollow chamber 104. The plunger flange 110 is made, for example, of plastic. In an embodiment, the plunger flange 110 is also teardrop-shaped. The top member 102 comprises a bottom surface 102*b*. In an embodiment, the bottom surface 102*b* of the top member 102 comprises a male luer lock connecter 117 that is in fluid connection with the barrel 119. In an embodiment, the infused grooming apparatus 100 further comprises a detachable plunger enhancer 112 disposed on top of the plunger flange 110. In an embodiment, the detachable plunger enhancer 112 is made of a plastic material. In another embodiment, the detachable plunger enhancer 112 is made of a metal. The plunger enhancer 112 comprises a first arm 112*a* and a second arm 112*b*, each of which extends in two directions. The second arm 112*b* of the plunger enhancer 112, at its distal end 112*d*, is connected to a manual slider 114*a* or 114*b* exemplarily illustrated in FIGS. 11-13. The first arm 112*a* of the plunger enhancer 112, at its distal end 112*c*, is connected to a thumb stand 116. The plunger enhancer 112 is configured to convert a downward movement of one or more of the first arm 112*a* and the second arm 112*b* to a downward movement of the plunger 118 for releasing the fluid from the barrel 119.

The hollow chamber 104 is in fluid connection with the barrel 119 of the top member 102. The hollow chamber 104 is configured to contain one or more fluids. The fluid(s) comprises, for example, any of oil, water, shampoo, conditioner, hair serum, hair care products, etc., or any combination thereof. The fluids are of different viscosities. The plunger 118 is configured to exert a pressure on the fluid contained in the hollow chamber 104. Therefore, when the plunger 118 is drawn out of the barrel 119, any fluid contained in the hollow chamber 104 enters the barrel 119, and when the plunger 118 is pushed into the barrel 119, the fluid in the barrel 119 is forced into the hollow chamber 104. The barrel 119 is configured to store a quantity of, for example, about 50 milliliters (ml) of fluid. The hollow chamber 104 comprises a top surface 104*a* and a bottom surface 104*b*. Multiple tubular members 120 are disposed on and project outwards from the bottom surface 104*b* of the hollow chamber 104. In an embodiment, the hollow chamber 104 and the tubular members 120 are made, for example, from plastic, and coated with a layer of soft silicone. In an embodiment, the top surface 104*a* of the hollow chamber 104 comprises a female luer lock connector 121 in fluid connection with an internal volume 104*c* defined by the hollow chamber 104 as exemplarily illustrated in FIG. 5. The male luer lock connecter 117 extending from the bottom surface 102*b* of the top member 102 is configured to engage with the female luer lock connector 121 on the top surface 104*a* of the hollow chamber 104 to attach the top member 102 to the hollow chamber 104, when the infused grooming apparatus 100 is assembled as exemplarily illustrated in FIG. 3. The top member 102 is operably connected to the hollow chamber 104 by engaging the male luer lock connecter 117 extending from the bottom surface 102*b* of the top member 102 with the female luer lock connector 121 on the top surface 104*a* of the hollow chamber 104.

The multi-prong attachment 106 comprises a top surface 106*a* and a bottom surface 106*b*. The multi-prong attachment 106 is teardrop shaped as exemplarily illustrated in FIG. 1. The top surface 106*a* of the multi-prong attachment 106 comprises multiple holes 122 configured to receive the tubular members 120 of the hollow chamber 104. The bottom surface 106*b* of the multi-prong attachment 106 comprises multiple hollow prongs 124 extending downwards from the corresponding holes 122 in the top surface 106*a* of the multi-prong attachment 106. The multi-prong attachment 106 comprises, for example, about 35 to about 50 evenly spaced hollow prongs 124 extending from its bottom surface 106*b*.

In an embodiment, each of the hollow prongs 124 comprises screw ridges 126 configured on an outer surface 124*b* of each hollow prong 124. The screw ridges 126 are screw threads extending from a distal end 124*a* of each hollow prong 124 to about a mid-section 124*c* of each hollow prong 124. The screw ridges 126 are configured to secure covering elements 802, for example, tip covers, sleeves, etc., on the hollow prongs 124 as exemplarily illustrated in FIG. 8 and FIGS. 9A-9B. The screw ridges 126 secure the covering elements 802 over the hollow prongs 124 and the distal ends 124*a* of the hollow prongs 124. The hollow prongs 124 of the multi-prong attachment 106 are configured to accommodate the tubular members 120 of the hollow chamber 104 therewithin. The multi-prong attachment 106 comprising the hollow prongs 124 is constructed, for example, from plastic. The hollow prongs 124 are coated, for example, with a layer of hard silicone, and the remainder of the multi-prong attachment 106 is coated, for example, with a layer of soft silicone. In an embodiment, a cross-section of each of the hollow prongs 124 across a length of each of the hollow prongs 124 is of a teardrop shape. Furthermore, in an embodiment, a tip, that is, the distal end 124*a* of each of the hollow prongs 124 is teardrop-shaped. In an embodiment, the tubular members 120 of the hollow chamber 104 and the hollow prongs 124 of the multi-prong attachment 106 correspond, for example, to pipettes, hypodermic needles, nozzles, etc.

In an embodiment, the infused grooming apparatus 100 further comprises a holding tray 108 configured to store fluids to be used for intake of fluids into or release of fluids out of the infused grooming apparatus 100. In an embodiment, a shape of the holding tray 108 is a teardrop shape. The fluids are of different viscosities. In an embodiment, the holding tray 108 comprises multiple holes 128 configured on its top surface 108*a* as disclosed in the description of FIGS. 7A-7B. The holes 128 of the holding tray 108 are configured to receive the hollow prongs 124 of the multi-prong attachment 106 and in an embodiment, facilitate intake of the fluids stored in the holding tray 108, through the hollow prongs 124.

In an embodiment, the infused grooming apparatus 100 disclosed herein allows a user to dispense fluids, for example, oil, shampoo, hair serum, coloring agents, hair products, etc., while performing grooming actions, for example, brushing hair, combing hair, stimulating the user's scalp, etc., rather than first applying the fluids on a surface, for example, the hair, the scalp, etc., by spraying and other deposition methods separately, and then performing the respective grooming actions.

For ease of description of the flow mechanism of the fluid during an intake process and a release process, the construction of the infused grooming apparatus 100 is disclosed herein with reference to three layers 100*a*, 100*b*, and 100*c* as exemplarily illustrated in FIG. 1. The intake process is a process of capturing the fluid from the holding tray 108 across the layers 100*a*, 100*b*, and 100*c* into the barrel 119. In an embodiment, the first layer 100*a* of the infused grooming apparatus 100 comprises the multi-prong attachment 106 comprising a top surface 106*a* and a bottom surface 106*b*. The top surface 106*a* of the multi-prong attachment 106 comprises multiple holes 122 configured to receive multiple tubular members 120. The bottom surface 106*b* of the multi-prong attachment 106 comprises multiple hollow prongs 124, each extending downwards from one of the holes 122 in the top surface 106*a* of the multi-prong attachment 106. The hollow prongs 124 are configured to accommodate the tubular members 120 therewithin. The second layer 100*b* of the infused grooming apparatus 100 comprises the hollow chamber 104 configured to contain a fluid. The hollow chamber 104 comprises the tubular members 120 disposed on and projecting outwards from the bottom surface 104*b* of the hollow chamber 104. The third layer 100*c* of the infused grooming apparatus 100 comprises the top member 102. The top member 102 comprises the barrel 119 and the plunger 118 configured to slide in the barrel 119. The plunger 118 is configured to exert a pressure on the fluid contained in the hollow chamber 104. The hollow prongs 124 of the multi-prong attachment 106 are configured to cover or mask the tubular members 120 disposed on the bottom surface 104*b* of the hollow chamber 104, when the second layer 100*b* is attached to the first layer 100*a*. In an embodiment, the tips, that is, the distal ends 124*a*, of the hollow prongs 124 comprise teardrop-shaped holes 124*d* as exemplarily illustrated in FIG. 6B, for fluid intake from the hollow chamber 104 and fluid release to the scalp of a user that results in direct scalp penetration of the fluid through the hollow prongs 124. Each hollow prong 124 is configured to dispense, for example, about 0.1 ml to about 0.4 ml of fluid at a time.

When the infused grooming apparatus 100 is assembled, the second layer 100*b* comprising the hollow chamber 104 is disposed between the third layer 100*c* comprising the top member 102 and the first layer 100*a* comprising the multi-prong attachment 106. The bottom surface 102*b* of the top member 102 comprises a male luer lock connecter 117 in fluid connection with the barrel 119. The top surface 104*a* of the hollow chamber 104 comprises a female luer lock connector 121 in fluid connection with the internal volume 104*c* defined by the hollow chamber 104. The female and male luer lock connectors 121 and 117 respectively, attach the hollow chamber 104 to the top member 102. The tubular members 120 of the hollow chamber 104 are inserted into the hollow prongs 124 of the multi-prong attachment 106 via the holes 122 of the multi-prong attachment 106. The hollow prongs 124 and the tubular members 120 allow fluids to pass through them. For example, during a fluid intake process, when a user pulls the plunger 118 above the barrel 119 using the plunger flange 110, the fluid from the holding tray 108 enters the distal ends 124*a* of the hollow prongs 124. The fluid then passes through the hollow prongs 124 and the tubular members 120 into the hollow chamber 104. From the hollow chamber 104, the fluid passes through the female luer lock connector 121, then into the male luer lock connector 117, and finally is collected in the barrel 119 of the top member 102. The plunger 118 is pulled out of the barrel 119 to intake the fluid. During a fluid release process, when the user pushes the plunger 118 into the barrel 119 using the plunger flange 110, the fluid from the barrel 119 passes through the male luer lock connector 117, then into the female luer lock connector 121, and then into the hollow chamber 104. From the hollow chamber 104, the fluid passes through the tubular members 120 and the hollow prongs 124. The fluid is then released through the holes 124*d* configured at the distal ends 124*a* of the hollow prongs 124 onto the scalp of a user.

The barrel 119 stores a quantity of, for example, about 50 ml of the fluid. In an embodiment, the hollow chamber 104 is also configured to store a quantity of fluid, for example, less than about 50 ml. In another example, the quantity of fluid stored in the hollow chamber 104 is more than about 50 ml. The multi-prong attachment 106 combines individual prong fluids together to ascend through the female luer lock connector 121 of the hollow chamber 104 and through the male luer lock connector 117 of the top member 102, into the barrel 119 during the fluid intake process.

In an embodiment, the infused grooming apparatus 100 is configured to accommodate one of multiple different hollow chambers 104, each having tubular members 120 of different sizes, for example, different widths, for releasing various fluids of different viscosities to a surface, for example, a scalp of a user. In another embodiment, the infused grooming apparatus 100 is configured to accommodate one of multiple different multi-prong attachments 106, each having hollow prongs 124 of different sizes, for example, different widths, for releasing various fluids of different viscosities to a surface, for example, a scalp of a user.

In another embodiment, the infused grooming apparatus 100 comprises a glowing or illuminating factor for dark settings. For example, one or more parts of the infused grooming apparatus 100 comprise phosphorescent material. Phosphorescence is a specific type of photoluminescence related to fluorescence. However, unlike fluorescence, a phosphorescent material does not immediately re-emit the radiation absorbed by the phosphorescent material. Instead, the phosphorescent material re-emits the absorbed radiation slowly. The slower time scales of re-emission are associated with "forbidden" energy state transitions in quantum mechanics. Furthermore, since these transitions occur very slowly in certain materials, absorbed radiation is re-emitted at a lower intensity for up to several hours after being charged with a bright light from the original excitation. Examples of most common phosphorescent materials comprise zinc sulfide and strontium aluminate, that glow for some time such as in any normal reading or room light.

Typically, the one or more parts of the infused grooming apparatus 100 glow for a few minutes or up to a few hours in a dark room. One or more parts of the infused grooming apparatus 100 that comprise phosphorescent material comprise the top member 102, the hollow chamber 104 comprising the tubular members 120, the multi-prong attachment 106 comprising the multiple hollow prongs 124, the barrel 119, the plunger 118, the plunger flange 110, the male luer lock connecter 117, the detachable plunger enhancer 112, and the thumb stand 116. In an embodiment, the holding tray 108 also comprises phosphorescent material. In an embodiment, the phosphorescent material is added to the material, for example, plastic, soft silicone, etc., when the grooming apparatus 100 is manufactured. In another embodiment, parts of the grooming apparatus 100, excluding the tubular members 120 and the multiple hollow prongs 124 are painted with a glow-in-the-dark paint that contains phosphorescent material.

In an embodiment, the holding tray 108 is configured to store a cleaning solution, for example, water. The cleaning solution stored in the holding tray 108 is used to clean leftover residue in the tubular members 120 and the hollow prongs 124. In an embodiment, cleaning is performed by rinsing with water using the same method of fluid intake and release disclosed above. In an embodiment, a fluid solution is captured multiple times from the holding tray 108 for re-fill purposes during the fluid intake process.

Figure 2:
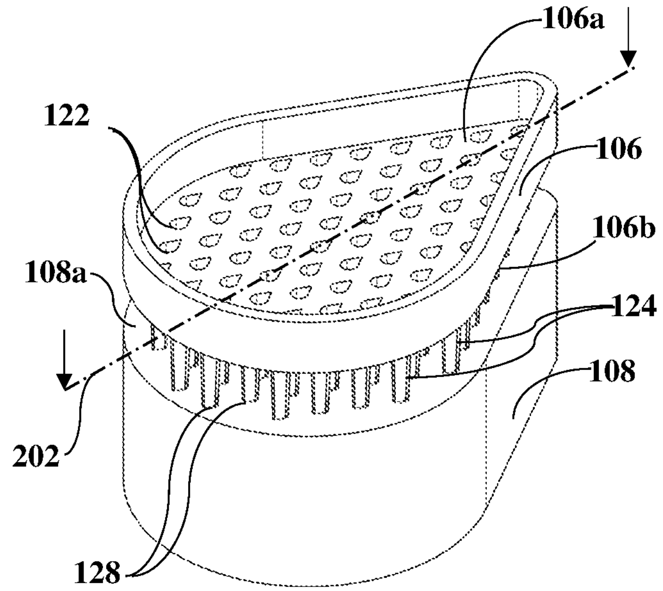
FIG. 2 exemplarily illustrates a front perspective view showing a multi-prong attachment of an embodiment of the infused grooming apparatus engaged with a holding tray.

FIG. 2 exemplarily illustrates a front perspective view showing the multi-prong attachment 106 of an embodiment of the infused grooming apparatus 100 engaged with the holding tray 108. The multi-prong attachment 106 comprises multiple holes 122 on its top surface 106*a* for receiving the tubular members 120 of the hollow chamber 104 exemplarily illustrated in FIG. 1. In an embodiment, the holes 122 in the top surface 106*a* of the multi-prong attachment 106 are teardrop-shaped as exemplarily illustrated in FIGS. 1-2. The hollow prongs 124 on the bottom surface 106*b* of the multi-prong attachment 106 fit into the holes 128 on the top surface 108*a* of the holding tray 108 as exemplarily illustrated in FIG. 2. Also shown in FIG. 2 is an axis 202 about which a cross-sectional view of the holding tray 108 is taken and exemplarily illustrated in FIG. 7A.

Figure 3:
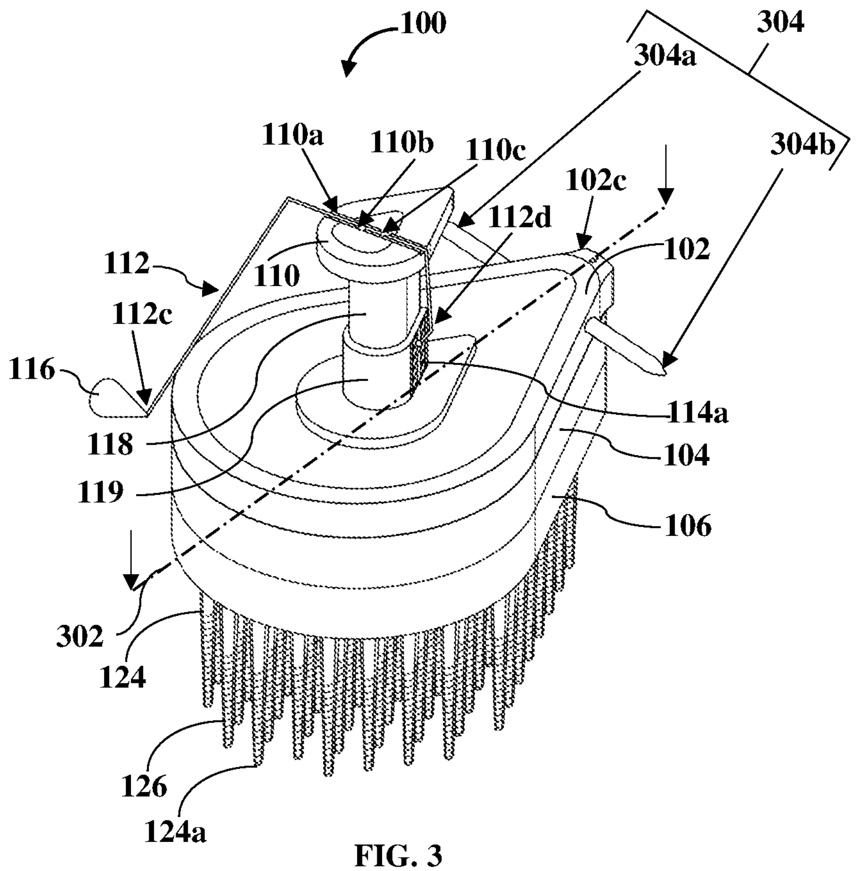
FIG. 3 exemplarily illustrates a front perspective view of an embodiment of the assembled, infused grooming apparatus.

FIG. 3 exemplarily illustrates a front perspective view of an embodiment of the assembled, infused grooming apparatus 100. Also shown in FIG. 3, is an axis 302 about which cross-sectional views of the top member 102, the hollow chamber 104, and the multi-prong attachment 106 are taken and exemplarily illustrated in FIG. 4, FIG. 5, and FIG. 6A respectively. To assemble the infused grooming apparatus 100, the second layer 100*b* is connected between the first layer 100*a* and the third layer 100*c* exemplarily illustrated in FIG. 1. For example, the third layer 100*c* comprising the top member 102 is connected to the second layer 100*b* comprising the hollow chamber 104 by engaging the male luer lock connecter 117 extending from the bottom surface 102*b* of the top member 102 to the female luer lock connecter 121 extending from the top surface 104*a* of the hollow chamber 104. The tubular members 120 of the hollow chamber 104 are then inserted into the corresponding holes 122 of the multi-prong attachment 106 exemplarily illustrated in FIG. 1, and further into the hollow prongs 124 of the multi-prong attachment 106 to form the infused grooming apparatus 100 exemplarily illustrated in FIG. 3. The top member 102, the hollow chamber 104, and the multi-prong attachment 106 are all teardrop-shaped, thereby forming a teardrop-shaped infused grooming apparatus 100 as exemplarily illustrated in FIG. 3. The infused grooming apparatus 100 is constructed, for example, from plastic. In an embodiment, the infused grooming apparatus 100 comprises a soft silicone covering disposed around a lining of its exterior body, excluding the hollow prongs 124, to prevent slippage of the infused grooming apparatus 100 during long time use or during an alternate grip of the infused grooming apparatus 100. The soft silicone covering on the infused grooming apparatus 100 provides a comfortable grip to a user's palm.

In an embodiment as exemplarily illustrated in FIG. 3, the top member 102 of the infused grooming apparatus 100 has a flat teardrop shape. In an embodiment, the top member 102 comprises a pair 304 of narrow, horizontal handles 304*a* and 304*b* for providing grip to fingers of a user and/or for placement of the fingers of the user. For example, a user can place three fingers such as a thumb, an index finger, and a middle finger of the user's right hand on one handle 304*a* of the pair 304 of handles on the left side of the infused grooming apparatus 100 and two fingers such as the ring finger and the little finger of the user's right hand on the other handle 304*b* of the pair 304 of handles on the right side of the infused grooming apparatus 100. Each handle 304*a* and 304*b* of the pair 304 of handles extends from a trailing end 102*c* of the tear-drop shaped top member 102. One handle 304*a* is disposed diametrically opposite to and away from the other handle 304*b*. In another example, the user can place two fingers such as the thumb and the index finger of the user's right hand on one handle 304*a* on the left side of the infused grooming apparatus 100 and three fingers such as the middle finger, the ring finger, and the little finger of the user's right hand on the other handle 304*b* on the right side of the infused grooming apparatus 100. In an embodiment, the pair 304 of handles is configured for an interchangeable holding position for left-handed and right-handed users. The placement of the fingers in the above-disclosed embodiments is mirrored for users with different hand orientations and holding positions. In an embodiment, the pair 304 of handles is made, for example, of plastic, and coated with a layer of a soft silicone material for a comfortable grip.

Figure 11:
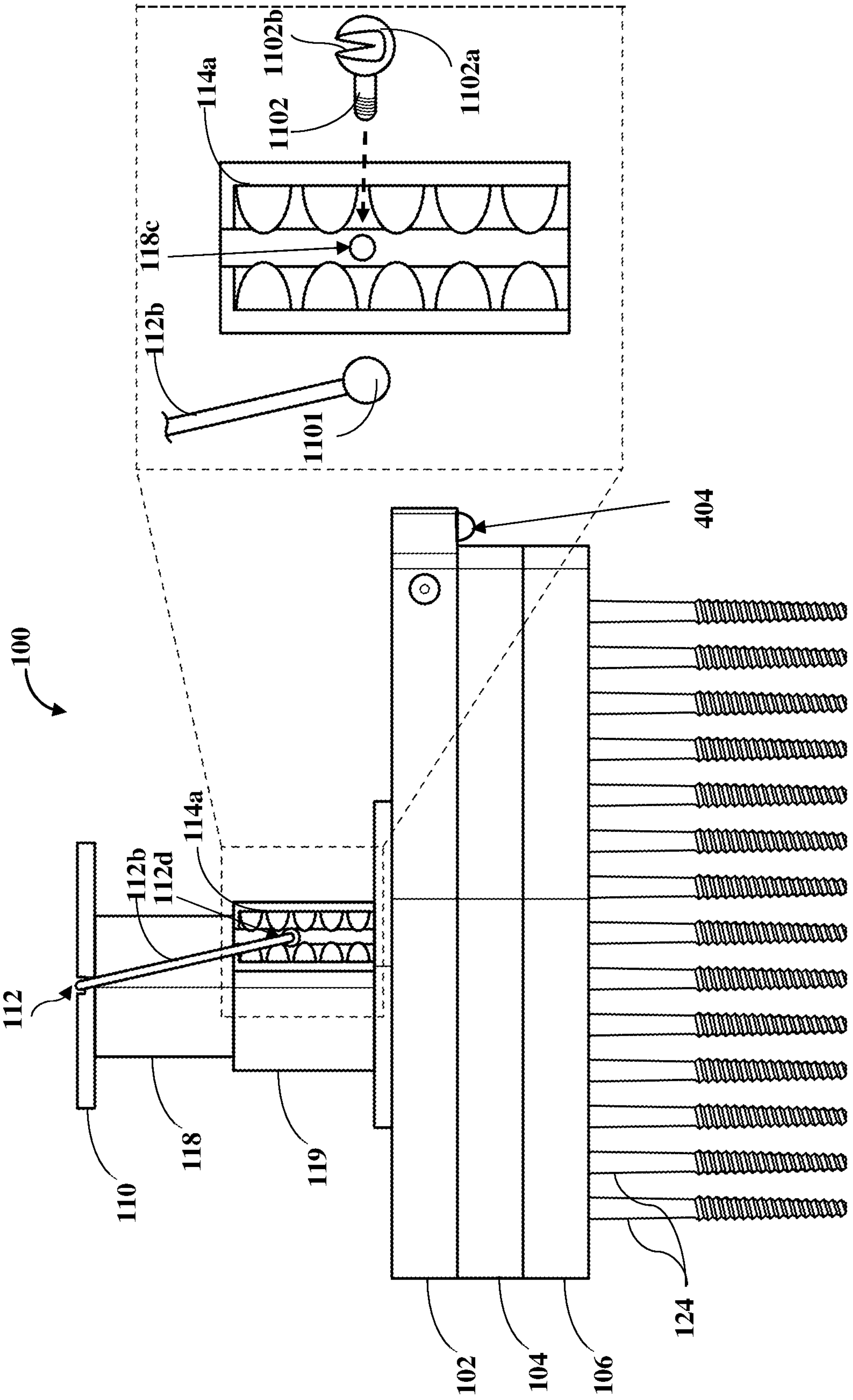
FIG. 11 exemplarily illustrates a right-hand side view of an embodiment of the infused grooming apparatus.
Figure 12:
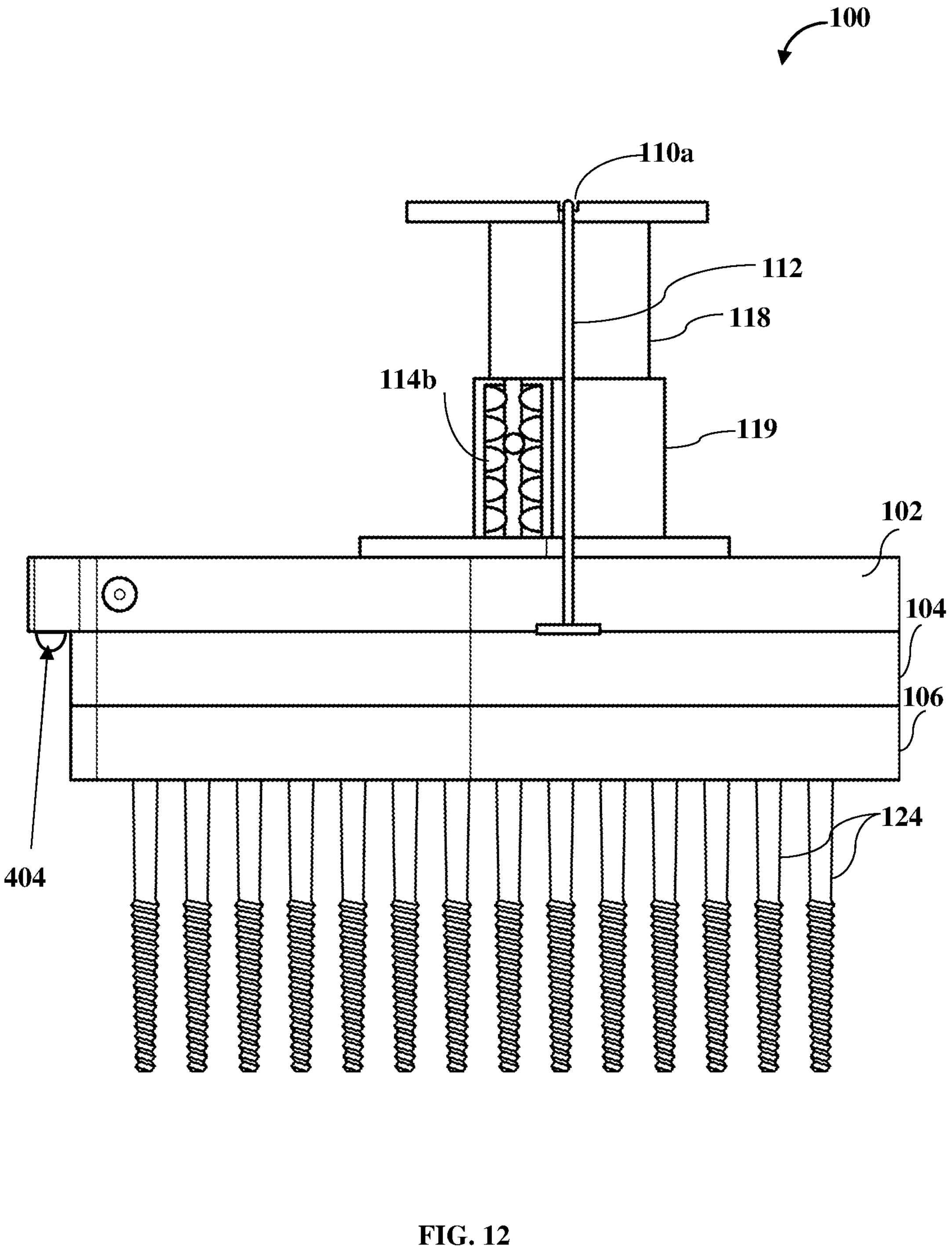
FIG. 12 exemplarily illustrates a left-hand side view of an embodiment of the infused grooming apparatus.
Figure 13:
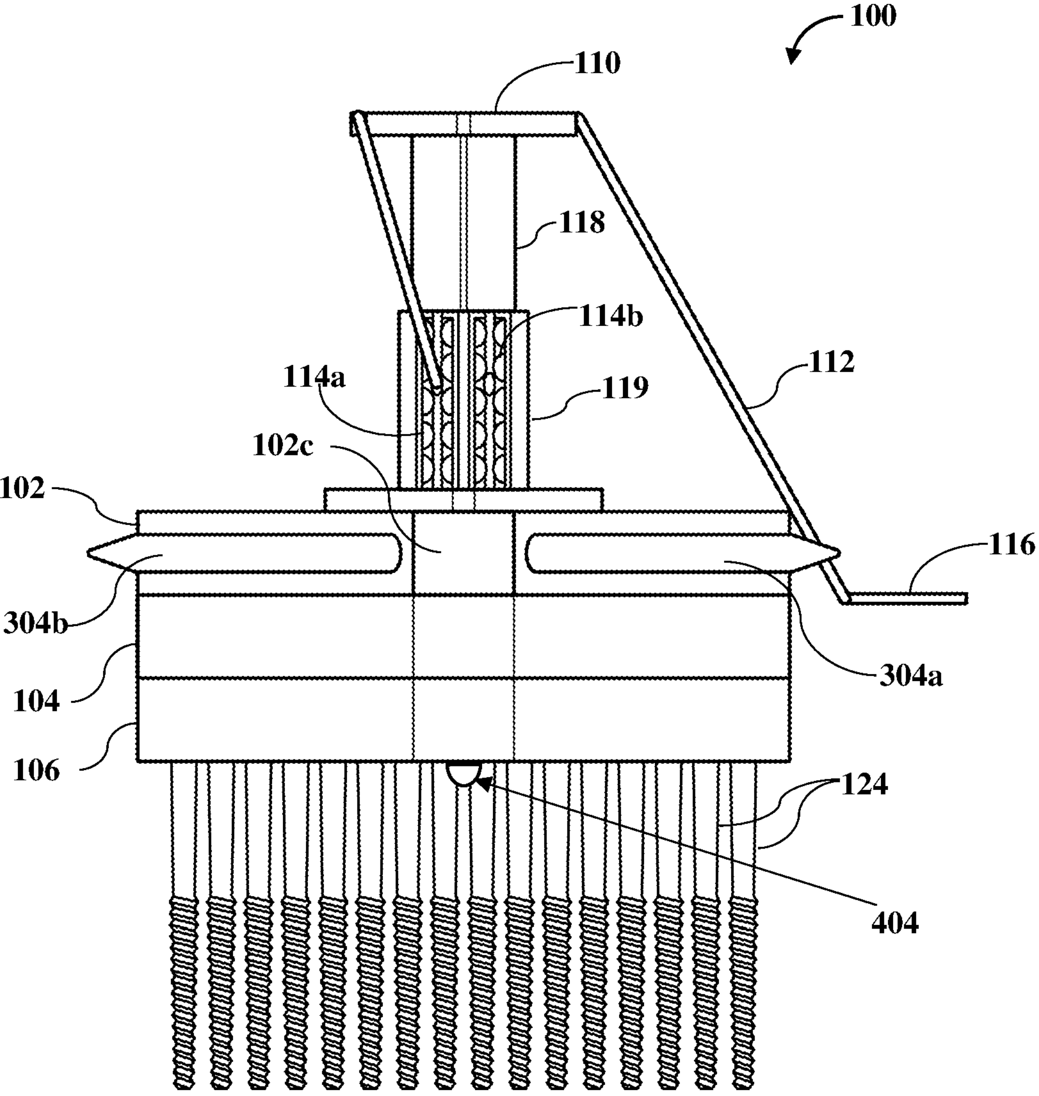
FIG. 13 exemplarily illustrates a rear elevation view of an embodiment of the infused grooming apparatus.

In an embodiment, the infused grooming apparatus 100 comprises a manual slider 114*a*, 114*b* disposed on each side of the barrel 119 as exemplarily illustrated in FIGS. 11-13. The second arm 112*b* of the plunger enhancer 112 is slidably coupled to the manual slider 114*a*, 114*b* at the distal end 112*d* of the second arm 112*b*. The manual slider 114*a*, 114*b* comprises a predetermined number of slidable positions traversable by the second arm 112*b* of the plunger enhancer 112 when a downward force acts on the first arm 112*a* of the plunger enhancer 112 exemplarily illustrated in FIG. 1. For example, the manual slider 114*a*, 114*b* is a 5-position manual slider 114*a*, 114*b* comprising five slidable positions traversable by the second arm 112*b* of the plunger enhancer 112 when a downward force acts on the first arm 112*a* of the plunger enhancer 112. The detachable plunger enhancer 112 is attached to one of the manual sliders 114*a* and 114*b* as exemplarily illustrated in FIG. 3. The detachable plunger enhancer 112 extends from a desired side, for example, a right side or a left side, of the barrel 119 to the opposite side, for example, the left side or the right side, of the infused grooming apparatus 100. In an embodiment, the position of the detachable plunger enhancer 112 is switchable or interchangeable based on the dominant hand and fingers of a user. The first arm 112*a* of the plunger enhancer 112 comprises the thumb stand 116 disposed at the distal end 112*c* of the first arm 112*a*. In an embodiment, a shape of the thumb stand 116 is a teardrop shape. The thumb stand 116 is configured to accommodate a thumb of a user. The thumb stand 116 is configured to transfer a downward pressure applied by the user's thumb on the thumb stand 116 to the plunger enhancer 112 and in turn to the plunger 118.

In an embodiment, the plunger flange 110 comprises a lock-fit groove 110*a* running across the width of the teardrop-shaped plunger flange 110 as exemplarily illustrated in FIG. 3. The lock-fit groove 110*a* is configured to accommodate the detachable plunger enhancer 112 when the detachable plunger enhancer 112 is disposed on top of the plunger flange 110. The lock-fit groove 110*a* is further configured to lock-fit the detachable plunger enhancer 112, thereby preventing the detachable plunger enhancer 112 from slipping from the top of the plunger flange 110. The plunger flange 110 further comprises multiple projections, for example, two projections 110*b* and 110*c*, on the top of the lock-fit groove 110*a*. One projection 110*b* extends from one side of the lock-fit groove 110*a* to a point about mid-way of the width of the lock-fit groove 110*a*, and the other projection 110*c* extends from the opposite side of the lock-fit groove 110*a* to a point about mid-way of the width of the lock-fit groove 110*a*. The detachable plunger enhancer 112 is detachably locked in the lock-fit groove 110*a* by the projections 110*b* and 110*c* when the detachable plunger enhancer 112 is pushed into the lock-fit groove 110*a*. The detachable plunger enhancer 112 is detached from the lock-fit groove 110*a* by pulling the thumb stand 116 upwards.

When the detachable plunger enhancer 112 is lock-fitted in the lock-fit groove 110*a* of the plunger flange 110, a downward pressure applied by the user's thumb on the thumb stand 116 is transferred to the plunger enhancer 112. During operation, the thumb stand 116 allows the user to apply pressure on the plunger enhancer 112 to descend, for example, through the five positions of the manual slider 114*a* or 114*b*, one at a time. In an embodiment, due to the applied pressure using the thumb stand 116, the plunger flange 110 is forced downwards to dispense the same predetermined amount of fluid, for example, about 3 ml to about 7 ml of fluid, for each of the five positions, that evenly disperses through the hollow prongs 124 onto a scalp of the user. The thumb stand 116 allows the user to apply pressure on the plunger flange 110 with a thumb on one side of the infused grooming apparatus 100 rather than on top of the infused grooming apparatus 100 to prevent an uncomfortable hand position during a grooming session.

FIG. 4 exemplarily illustrates a right-hand side, cross-sectional view of the top member 102 of an embodiment of the infused grooming apparatus 100 shown in FIG. 1 and FIG. 3. The cross-sectional view shown in FIG. 4 has been taken about the axis 302 shown in FIG. 3. The cross-section of the plunger 118, the barrel 119, and the male luer lock connector 117 of the top member 102 are exemplarily illustrated in FIG. 4. The plunger 118 passes through the top member 102. More specifically, the plunger 118 extends above the male luer lock connecter 117 and further extends out of the barrel 119. The male luer lock connecter 117 extending from the bottom surface 102*b* of the top member 102 is configured to engage with the female luer lock connector 121 on the top surface 104*a* of the hollow chamber 104 exemplarily illustrated in FIG. 5, when the infused grooming apparatus 100 is assembled as exemplarily illustrated in FIG. 3. The plunger flange 110 is disposed on a proximal end 118*a* of the plunger 118. FIG. 4 also shows the lock-fit groove 110*a* and the projections 110*b* and 110*c* on the top of the lock-fit groove 110*a* configured to lock-fit the plunger enhancer 112 to the plunger flange 110 as exemplarily illustrated in FIG. 3.

In an embodiment, the infused grooming apparatus 100 further comprises a plunger seal 404 attached to a lower end 118*b* of the plunger 118. More specifically, the plunger seal 404 is located in the barrel 119 and positioned between the lower end 118*b* of the plunger 118 and the male luer lock connector 117. The plunger seal 404 is configured as a stopper to prevent leakage of the fluid. The plunger seal 404 is further configured to provide a pressurized movement of the fluid in the teardrop-shaped barrel 119. When the plunger 118 exerts pressure on the barrel 119, pressure is exerted on the fluid in the barrel 119 due to the plunger seal 404. It may be appreciated by those skilled in the art that the plunger 118 corresponds to a shaft on which pressure is applied to reach the plunger seal 404, thereby releasing the fluid contained in the barrel 119 through the distal ends 124*a* of the hollow prongs 124 of the multi-prong attachment 106 exemplarily illustrated in FIG. 3. The plunger flange 110 corresponds to a handle that is pressurized to dispense the fluids stored in the hollow chamber 104 and/or the barrel 119. The cross-section of the plunger 118 shows a threaded hole 118*c* configured for receiving a screw 1102 exemplarily illustrated in FIG. 11, used for operating the plunger enhancer 112 as disclosed in the description of FIG. 11.

In an embodiment as exemplarily illustrated in FIG. 4, the top member 102 of the infused grooming apparatus 100 comprises a compartment 401 disposed between the pair 304 of handles 304*a* and 304*b* at the trailing end 102*c* of the teardrop-shaped top member 102. The compartment 401 is configured to house a vibration unit 402. The trailing end 102*c* of the top member 102 comprises a switch 403 configured to operate the vibration unit 402. In an embodiment, the vibration unit 402 comprises a battery-powered vibrator configured to generate vibrations of predetermined intensities. In an embodiment, the vibration unit 402 is implemented with a power source (not shown) and a motor-operated vibrator (not shown) that provides an appropriate intensity of vibration to the infused grooming apparatus 100 for stimulating a surface, for example, a user's scalp. In an embodiment, the power source is a battery configured in the vibration unit 402 inside the compartment 401. The vibrator (not shown) is implemented using any device configured to produce a desired intensity of vibration to stimulate the user's scalp. In an embodiment, the switch 403 is operably connected on top of the trailing end 102*c* of the top member 102, proximal to the pair 304 of handles 304*a* and 304*b* for ease of operation using the fingers of the user. The switch 403 is used for switching on or switching off the vibrator in the vibration unit 402 when required. In an embodiment, the grooming apparatus 100 comprises a light source 404 underneath the vibration unit 402, as illustrated in FIGS. 4, and 11-13. In this embodiment, the switch 403 is a 4-position rotary switch, for example, a 4 position rotary cam switch model K10D004NCH manufactured by Schneider Electric headquartered in Rueil-Malmaison, France. The 4-position rotary switch comprises an off position, and 3 on positions. Connections between the battery, the vibration unit 402, the light source 404 and the 4-position rotary switch are wired such that turning a knob of the 4-position rotary switch switches on either the vibration unit 402, the light source 404, or both. For example, turning the knob to a first position switches on the vibration unit 402, turning the knob to a second position switches on the of the light source 404, and turning the knob to a third position switches on both the vibration unit 402 and the light source 404.

Figure 5:
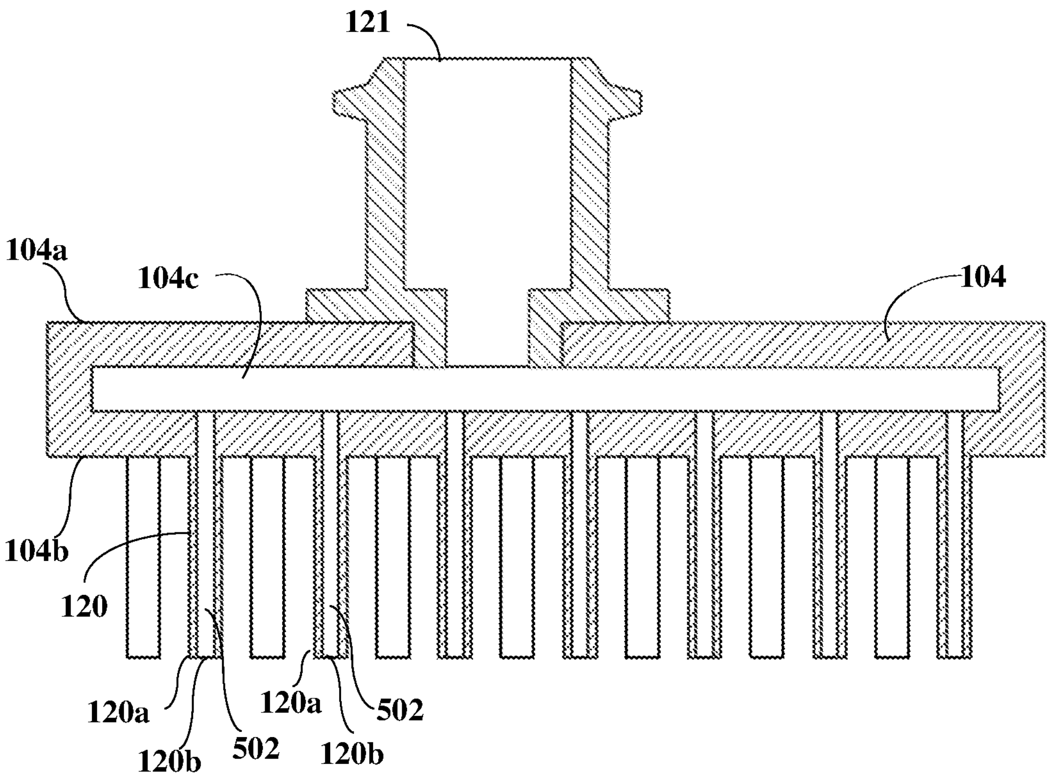
FIG. 5 exemplarily illustrates a right-hand side, cross-sectional view of a hollow chamber of an embodiment of the infused grooming apparatus.

FIG. 5 exemplarily illustrates a right-hand side, cross-sectional view of the hollow chamber 104 of an embodiment of the infused grooming apparatus 100 shown in FIG. 1 and FIG. 3. The cross-sectional view shown in FIG. 5 has been taken about the axis 302 shown in FIG. 3. The female luer lock connector 121 on the top surface 104a of the hollow chamber 104 is configured to engage with the male luer lock connecter 117 on the bottom surface 102b of the top member 102 exemplarily illustrated in FIG. 4, to attach the hollow chamber 104 to the top member 102. Also shown in FIG. 5 is the internal volume 104c of the hollow chamber 104 in fluid communication with the female luer lock connector 121. The internal volume 104c of the hollow chamber 104 is configured to contain a fluid. When the plunger 118 is pushed into the barrel 119 exemplarily illustrated in FIG. 4, the fluid in the barrel 119 is forced into the hollow chamber 104, and from the internal volume 104c of the hollow chamber 104, the fluid passes through channels 502 defined within the tubular members 120 of the hollow chamber 104, out through the holes 120b configured at the distal ends 120a of the tubular members 120, and into the hollow prongs 124 of the multi-prong attachment 106 exemplarily illustrated in FIGS. 6A-6B, for direct application on a surface, for example, a user's scalp.

Figure 6A:
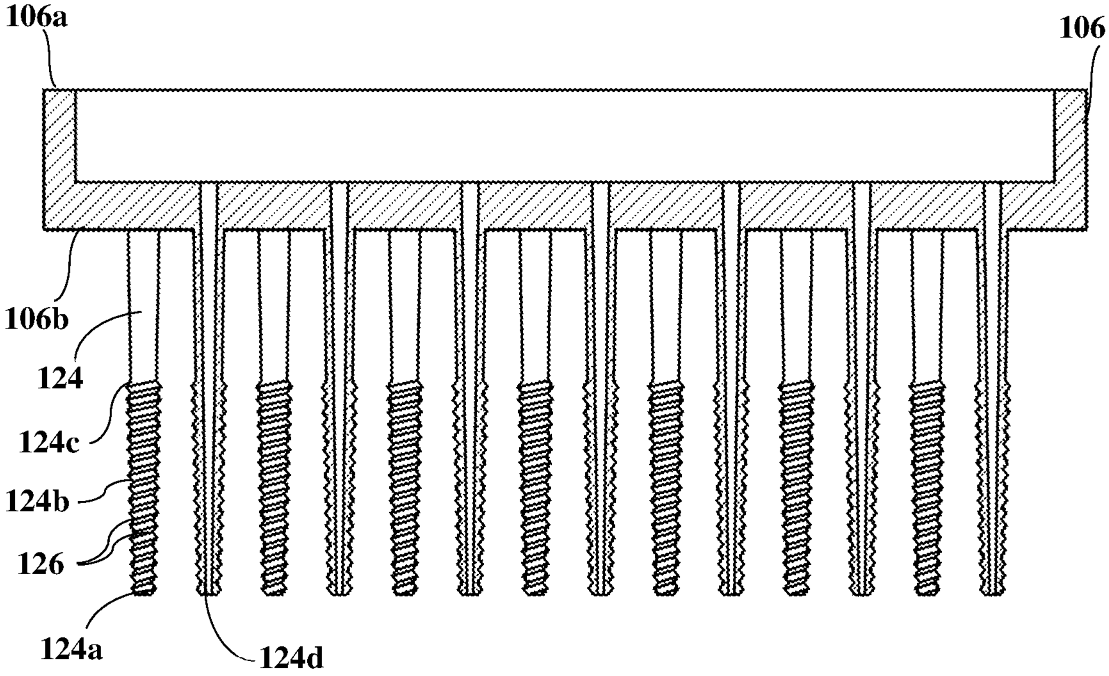
FIG. 6A exemplarily illustrates a right-hand side, cross-sectional view of the multi-prong attachment of an embodiment of the infused grooming apparatus.

FIG. 6A exemplarily illustrates a right-hand side, cross-sectional view of the multi-prong attachment 106 of an embodiment of the infused grooming apparatus 100 shown in FIG. 1 and FIG. 3. The cross-sectional view shown in FIG. 6A, has been taken about the axis 302 shown in FIG. 3. The distal end 124a of each of the hollow prongs 124 comprises a hole 124d through which a fluid is dispensed onto a surface, for example, a user's scalp. The hollow prongs 124 on the bottom surface 106b of the multi-prong attachment 106 are made, for example, of silicone or plastic. In an embodiment, the hollow prongs 124 on the bottom surface 106b of the multi-prong attachment 106 are made of plastic and coated with soft silicone. Also shown in FIG. 6A are the screw ridges 126 configured on the outer surface 124b towards the distal end 124a of each of the hollow prongs 124.

Figure 6B:
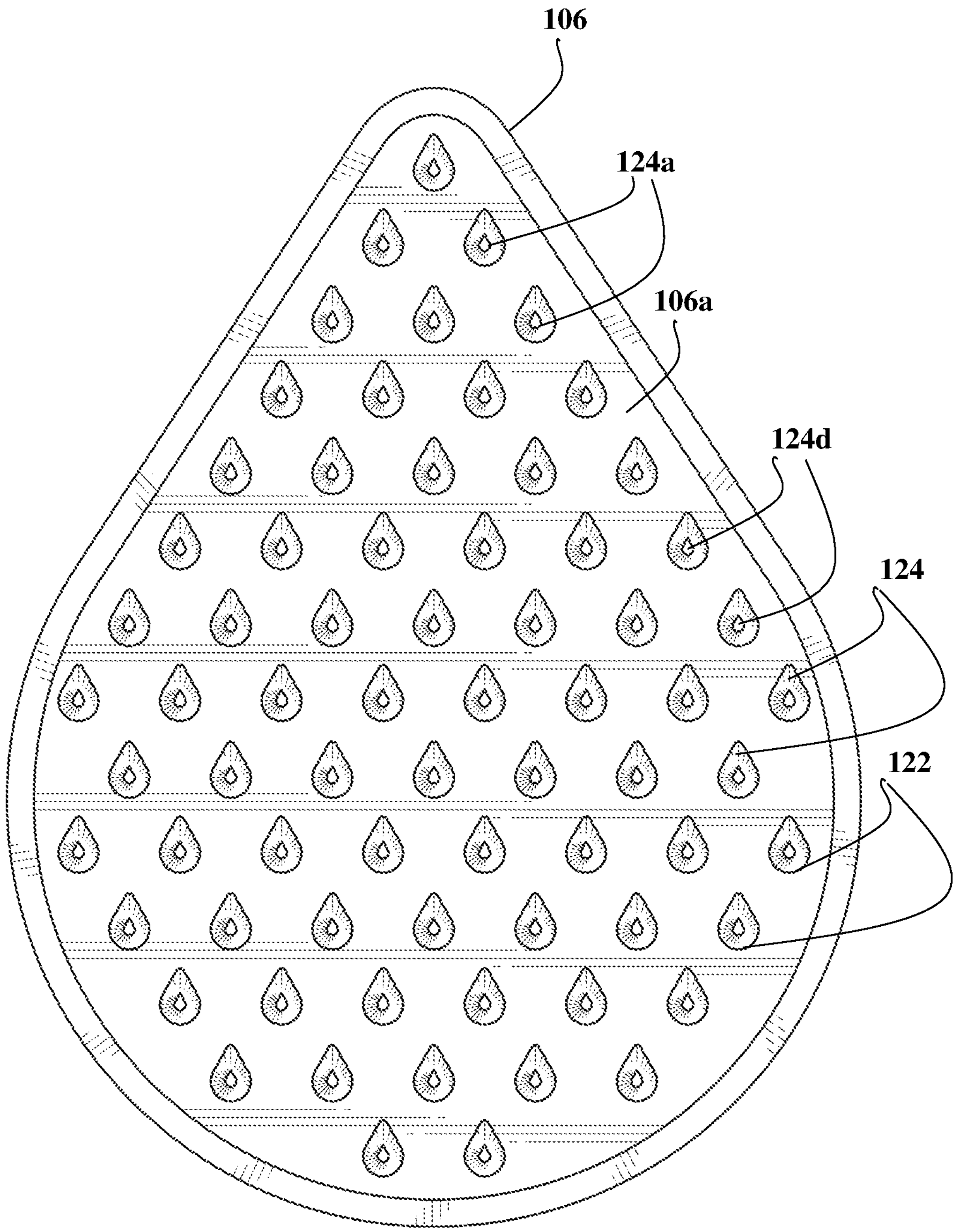
FIG. 6B exemplarily illustrates a top plan view of the multi-prong attachment of an embodiment of the infused grooming apparatus.

FIG. 6B exemplarily illustrates a top plan view of the multi-prong attachment 106 of an embodiment of the infused grooming apparatus 100 shown in FIG. 1 and FIG. 3. In an embodiment as exemplarily illustrated in FIG. 6B, the tips, that is, the distal ends 124a, of the hollow prongs 124 comprise teardrop-shaped holes 124d for dispensing a fluid of any viscosity. FIG. 6B also illustrates the embodiment of the multi-prong attachment 106 where the cross-section of each of the hollow prongs 124 across a length of each of the hollow prongs 124 is of a teardrop shape. Furthermore, FIG. 6B exemplarily illustrates the embodiment where the holes 122 in the top surface 106a of the multi-prong attachment 106 are teardrop-shaped.

Figure 7A:
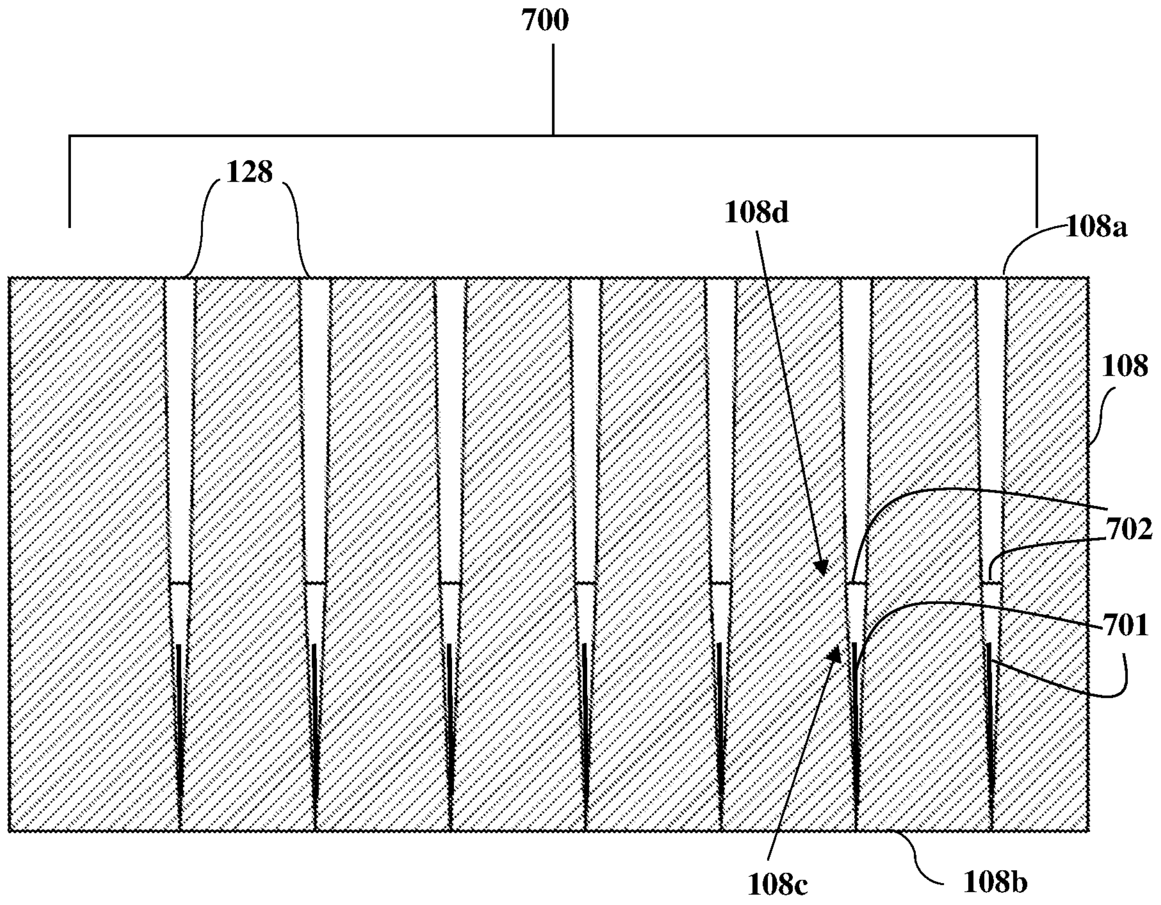
FIG. 7A exemplarily illustrates a right-hand side, cross-sectional view of the holding tray of an embodiment of the infused grooming apparatus.
Figure 7B:
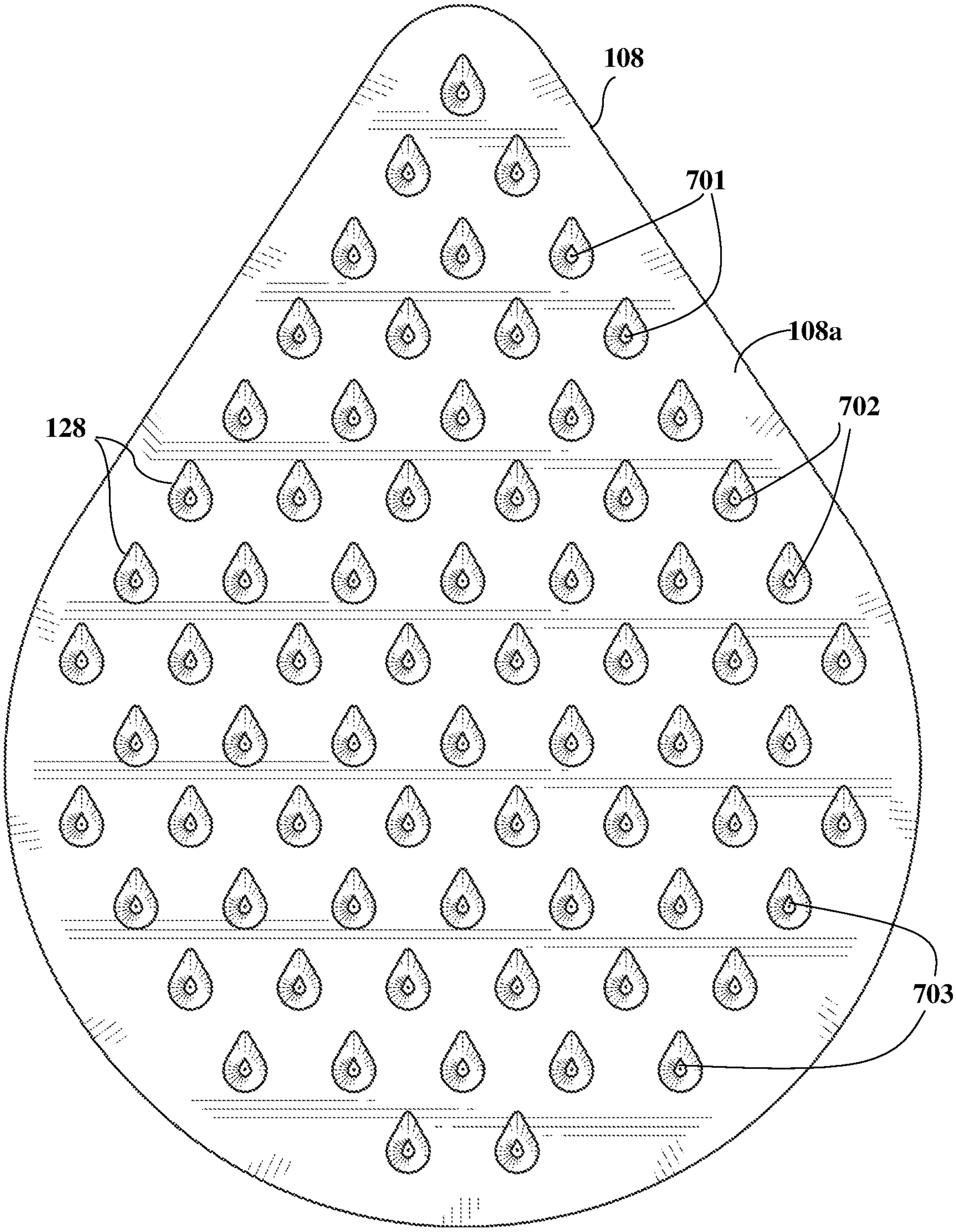
FIG. 7B exemplarily illustrates a top plan view of the holding tray of an embodiment of the infused grooming apparatus.

FIG. 7A exemplarily illustrates a right-hand side, cross-sectional view of the holding tray 108 of an embodiment of the infused grooming apparatus 100 shown in FIG. 1 and FIG. 2. The cross-sectional view shown in FIG. 7A has been taken about the axis 202 shown in FIG. 2. FIG. 7B exemplarily illustrates a top plan view of the holding tray 108. In an embodiment, the holes 128 configured on the top surface 108a of the holding tray 108 are teardrop-shaped as exemplarily illustrated in FIGS. 1-2 and FIG. 7B. The holes 128 taper down towards the bottom surface 108b of the holding tray 108. The bottom surface 108b of the holding tray 108 is closed. Therefore, any fluid stored in the holes 128 does not flow out of the bottom surface 108b of the holding tray 108. The holes 128 of the holding tray 108 are configured to receive the hollow prongs 124 of the multi-prong attachment 106 exemplarily illustrated in FIG. 6A, for executing an intake of fluid contained in the holding tray 108 as disclosed in the description of FIG. 1. In an embodiment, the holding tray 108 is made, for example, of plastic or silicone. In another embodiment, the detachable holding tray 108 is made, for example, of plastic, and is coated with soft silicone. The holding tray 108 is detached when the infused grooming apparatus 100 is in use by a user for grooming. The holding tray 108 is used when the fluid in the infused grooming apparatus 100 needs to be refilled or a cleaning solution needs to be used during a fluid intake process. In an embodiment, the holding tray 108 is used to store the fluids to be captured by the infused grooming apparatus 100 at a later time.

In an embodiment, each of the holes 128 in the holding tray 108 is configured to accommodate a length of the hollow prongs 124. In an embodiment, each hole 128 in the holding tray 108 is configured to accommodate about $3/4^{th}$ of the length of a hollow prong 124. In another embodiment, each hole 128 in the holding tray 108 is configured to accommodate about half of the length of a hollow prong 124. In an embodiment, the holes 128 in the holding tray 108 correspond to a reverse prong set 700 since the shape of each of the holes 128 generally matches the external shape of a hollow prong 124. The holes 128 of the holding tray 108 are configured to receive, accommodate, and securely hold the hollow prongs 124 of the multi-prong attachment 106. In an embodiment, each hole 128 in the holding tray 108 comprises a mount 701 disposed proximal to a lower section 108c of the holding tray 108. The mount 701 is configured to securely hold a covering element 802 in place while the hollow prong 124 is fastened into the covering element 802 as exemplarily illustrated in FIG. 10B.

In an embodiment, the holes 128 of the holding tray 108 are configured to form fit the hollow prongs 124 of the multi-prong attachment 106. For example, each hole 128 of the holding tray 108 is configured to form fit a corresponding one of the hollow prongs 124 of the multi-prong attachment 106 when the infused grooming apparatus 100 is placed in and engaged with the holding tray 108. In an embodiment, a fluid, for example, oil, is poured into the holes 128 of the holding tray 108. In an embodiment, the holes 128 allow easy syringe intake of the fluid contained in the holes 128 through the hollow prongs 124 of the multi-prong attachment 106. In an embodiment as exemplarily illustrated in FIGS. 7A-7B and FIG. 10B, each hole 128 in the holding tray 108 comprises a teardrop-shaped stopper 702 disposed proximal to the mid-section 108d of the holding tray 108. The teardrop-shaped stopper 702 is configured to prevent the distal end 124a of each of the hollow prongs 124 from directly touching the bottom of the holding tray 108 where fluids are contained. In an embodiment, the teardrop-shaped stopper 702 comprises a teardrop-shaped hole 703 as exemplarily illustrated in FIG. 7B and FIG. 10B. The teardrop-shaped hole 703 allows debris in the fluid to collect at the bottom surface 108b of the holding tray 108.

Figure 8:
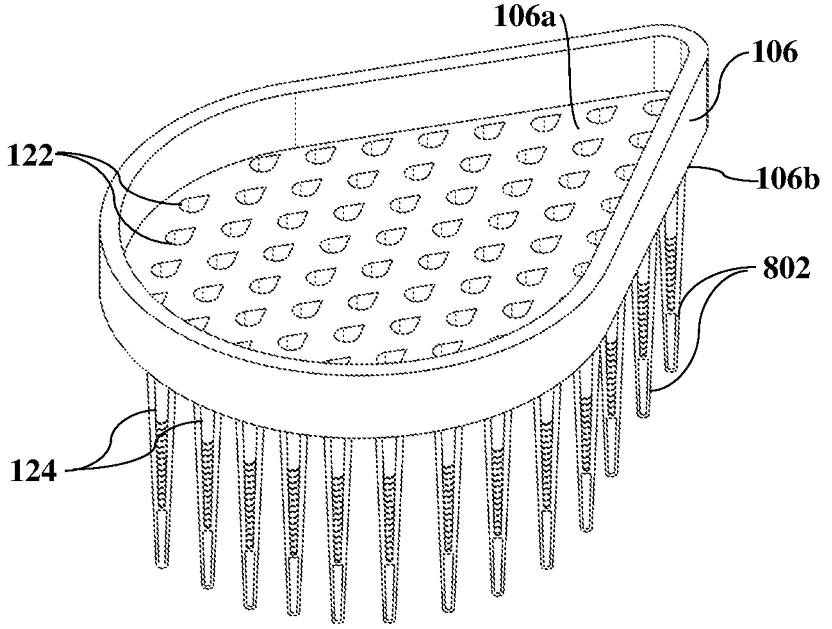
FIG. 8 exemplarily illustrates a front perspective view of the multi-prong attachment.

FIG. 8 exemplarily illustrates a front perspective view of the multi-prong attachment 106. In an embodiment, a covering element 802, for example, a prong cover, a sleeve, etc., is provided for covering each of the hollow prongs 124 of the multi-prong attachment 106 and their distal ends 124a, when not in use. As exemplarily in FIG. 8, each of the hollow prongs 124 is covered by the covering element 802.

Figure 9A:
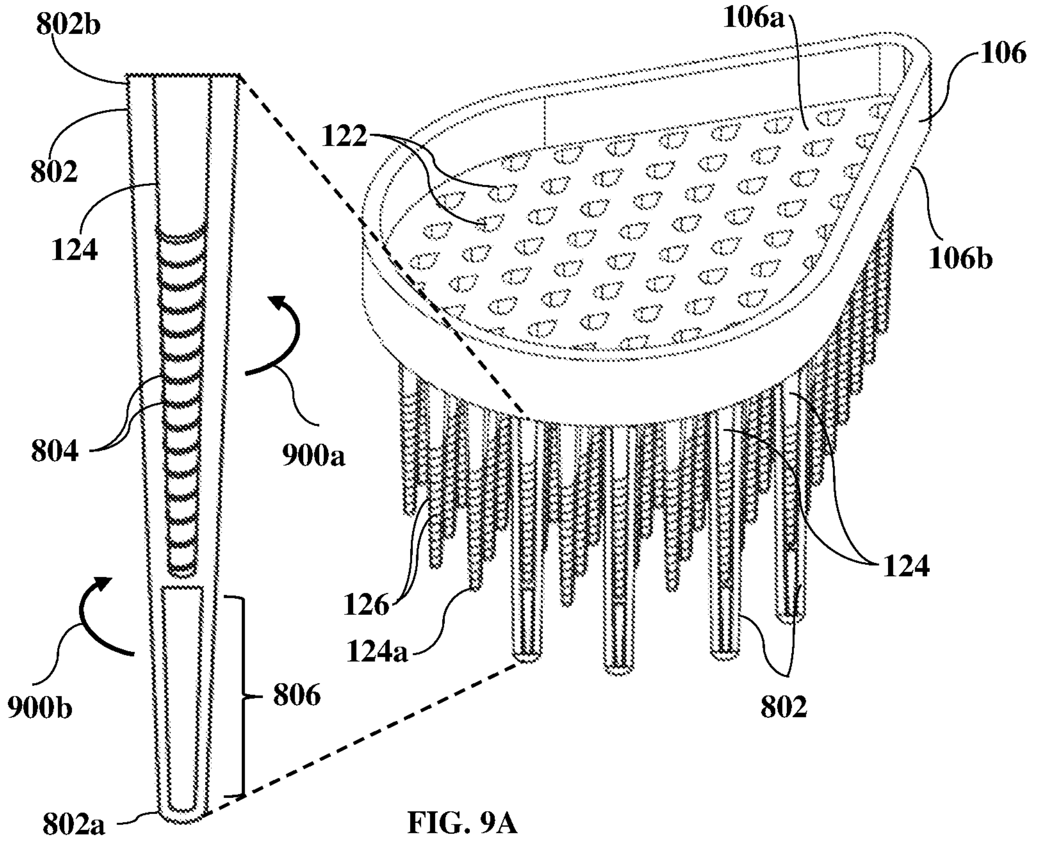
FIG. 9A exemplarily illustrates a front perspective view of an embodiment of the multi-prong attachment comprising covering elements attached to few hollow prongs of the multi-prong attachment.
Figure 9B:
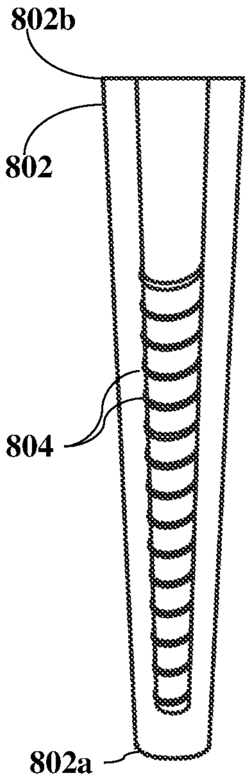
FIG. 9B exemplarily illustrates an embodiment of a covering element without an extension.

FIG. 9A exemplarily illustrates a front perspective view of an embodiment of the multi-prong attachment 106 comprising covering elements 802 attached to few of the hollow prongs 124 of the multi-prong attachment 106. In an embodiment, the covering elements 802 are reverse fitting prongs configured, for example, as sleeves, for accommodating and covering the hollow prongs 124 of the multi-prong attachment 106. Also shown in FIG. 9A is an enlarged view of a hollow prong 124 covered by a covering element 802. In an embodiment, each covering element 802 comprises a fastening mechanism, for example, a pop on/off tip mechanism, a screw mechanism, etc., for attaching the covering element 802 to each of the hollow prongs 124. In an embodiment, the covering elements 802 comprise screw-like ridges 804 on their internal surfaces configured to create a secure fit around the hollow prongs 124. The screw-like ridges 804 of each covering element 802 are configured to engage with the screw ridges 126 of each hollow prong 124 to attach the covering element 802 to each hollow prong 124. In an embodiment, the covering element 802 is rotated in a counterclockwise direction indicated by an arrow 900*a* in FIG. 9A, to allow the screw-like ridges 804 on the internal surface of the covering element 802 to engage with the screw ridges 126 of a hollow prong 124 and pull the covering element 802 a short distance towards the hollow prong 124, thereby securing the covering element 802 to the hollow prong 124. To disengage the covering element 802 from the hollow prong 124, the covering element 802 is rotated in a clockwise direction indicated by an arrow 900*b* in FIG. 9A. The covering elements 802 that cover the hollow prongs 124 preclude the fluid from dispensing through the holes 124*d* at the distal ends 124*a* of the hollow prongs 124 exemplarily illustrated in FIGS. 6A-6B, and can, therefore, be used for stimulating or massaging a user's scalp. The covering elements 802 also prevent substances from the user's scalp, hair, etc., from clogging the covered hollow prongs 124. In an embodiment, the covering elements 802 are configured to protect the hollow prongs 124 and their distal ends 124*a* from damage.

In an embodiment, each covering element 802 comprises an extension 806 that extends a short distance from a bottom end 802*a* of the covering element 802 as exemplarily illustrated in FIG. 9A. The extension 806 of each covering element 802 raises a top end 802*b* of each covering element 802 above the holding tray 108, when the covering elements 802 are placed in individual holes 128 of the holding tray 108. In an embodiment, when the hollow prongs 124 of the multi-prong attachment 106 are covered by the covering elements 802 and the infused grooming apparatus 100 is placed in the holding tray 108, the extension 806 in each covering element 802 maintains the multi-prong attachment 106 above the holding tray 108. In an embodiment, the covering element 802 is free of an extension 806 as exemplarily illustrated in FIG. 9B.

Figure 10A:
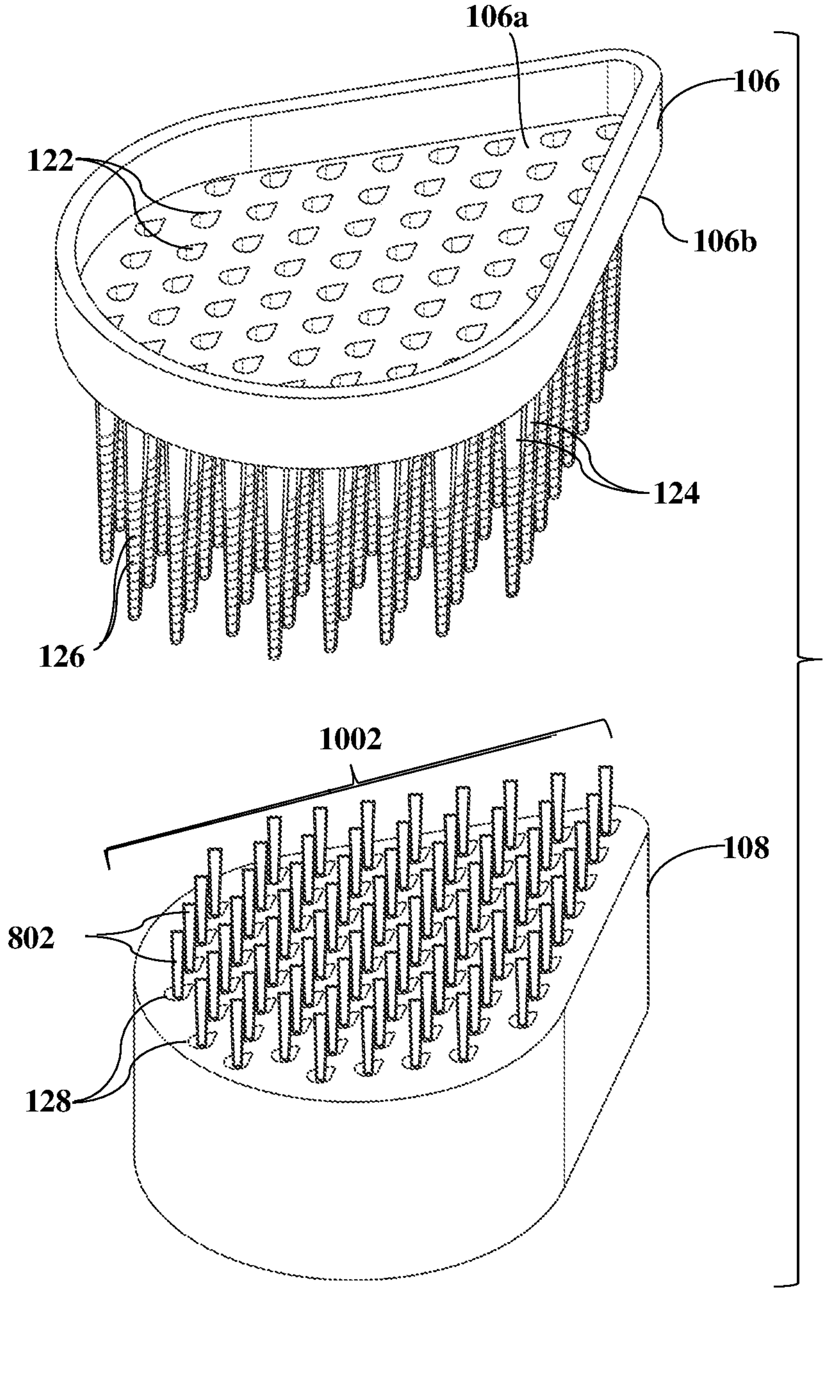
FIG. 10A exemplarily illustrates a front perspective view of an embodiment of the holding tray, showing the multi-prong attachment positioned to engage with the holding tray.

FIG. 10A exemplarily illustrates a front perspective view of an embodiment of the holding tray 108, showing the multi-prong attachment 106 positioned to engage with the holding tray 108. In an embodiment, the holding tray 108 is made, for example, of silicone, plastic, etc., and comprises a set 1002 of multiple covering elements 802 as exemplarily illustrated in FIG. 10A. In operation, a user aligns each of the hollow prongs 124 of the multi-prong attachment 106 with a corresponding one of the multiple covering elements 802 in the holding tray 108 and places the infused grooming apparatus 100 in the holding tray 108 by inserting each of the hollow prongs 124 of the multi-prong attachment 106 into the corresponding one of the multiple covering elements 802 in the holding tray 108. In an embodiment, the user applies one or more of a twisting force and a downward force on the infused grooming apparatus 100 until the hollow prongs 124 of the multi-prong attachment 106 are secured by the covering elements 802. In another embodiment (not shown), the covering elements 802 are free of the screw-like ridges 804 exemplarily illustrated in FIG. 9A, and are configured as a reverse prong set configured to receive the hollow prongs 124 of the multi-prong attachment 106. In this embodiment, the hollow prongs 124 of the multi-prong attachment 106 are free of the screw ridges 126 and are placed in a snap-fit engagement with the covering elements 802.

Figure 10B:
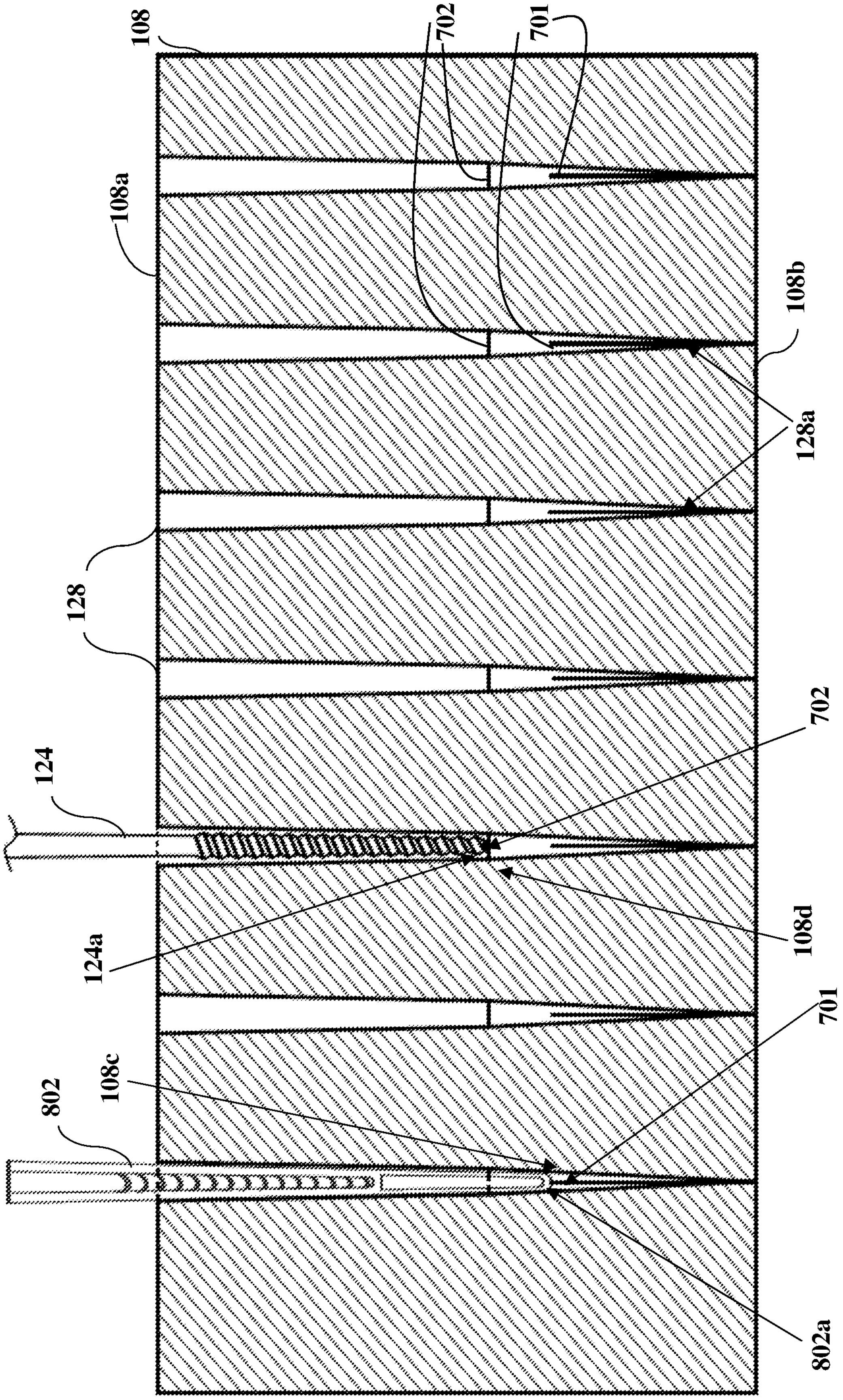
FIG. 10B exemplarily illustrates a right-hand side, cross-sectional view of an embodiment of the holding tray, showing a hollow prong of the multi-prong attachment and a covering element inserted into the holes on a top surface of the holding tray.

FIG. 10B exemplarily illustrates a right-hand side, cross-sectional view of an embodiment of the holding tray 108, showing a hollow prong 124 of the multi-prong attachment 106 and a covering element 802 inserted into the holes 128 on the top surface 108*a* of the holding tray 108. FIG. 10B exemplarily illustrates the extent to which the hollow prong 124 and the covering element 802 are insertable into the holes 128 of the holding tray 108. As exemplarily illustrated in FIG. 10B, the teardrop-shaped stopper 702 disposed proximal to the mid-section 108*d* of the holding tray 108 prevents the distal end 124*a* of each of the hollow prongs 124 from directly touching the bottom 128*a* of the holding tray 108. The teardrop-shaped stopper 702 holds the distal end 124*a* of the hollow prong 124 firmly in position. In an embodiment, the mounts 701, disposed proximal to the lower section 108*c* of the holding tray 108 are configured to support the bottom ends 802*a* of the covering elements 802 as exemplarily illustrated in FIG. 10B. As exemplarily illustrated in FIGS. 7A-7B and FIG. 10B, each mount 701 has a thin elongated structure that projects substantially perpendicularly upwards from the bottom 128*a* of the holes 128. In an embodiment, each mount 701 projects perpendicularly upwards and terminates, for example, about 1 mm to about 5 mm, below the teardrop-shaped stopper 702.

FIG. 11 exemplarily illustrates a right-hand side view of an embodiment of the infused grooming apparatus 100. As disclosed in the descriptions of FIGS. 3-4, a manual slider 114*a* or 114*b*, for example, a 5-position manual slider, is configured on either side of the barrel 119. An enlarged, exploded view of the 5-position manual slider 114*a* or 114*b* showing a set of five positions is also shown in FIG. 11. The plunger enhancer 112 click-fits into one of the five positions of the manual slider 114*a* or 114*b* based on the operation of the thumb stand 116. The plunger enhancer 112 is configured to traverse each of the positions in a sliding manner one-by-one to dispense a predetermined amount of fluid through the hollow prongs 124 of the multi-prong attachment 106 by pressing the thumb stand 116 downwards. Since users typically have hair of different types and densities, the manual slider 114*a* or 114*b* provides users with an option to regulate the amount of fluid dispensed on their hair or scalps. In an embodiment, the manual slider 114*a* or 114*b* corresponds to an N-position manual slider, where "N" denotes a count or number of positions provided in the manual slider 114*a* or 114*b*. Each position represents a step or a point corresponding to an amount of fluid to be dispensed, and therefore, by configuring the step size or count, the amount of fluid to be dispensed is further controlled by a user with precision. In another embodiment, the count of steps or points in the manual slider 114*a* or 114*b* is customizable for different hair densities and types.

The distal end 112*d* of the second arm 112*b* of the plunger enhancer 112 is connected to the manual slider 114*a* or 114*b* as exemplarily illustrated in FIG. 11, and the distal end 112*c* of the first arm 112*a* of the plunger enhancer 112 is connected to the thumb stand 116 as exemplarily illustrated in FIG. 1. In an embodiment, the distal end 112*d* of the second arm 112*b* of the plunger enhancer 112 comprises a spherical pin head 1101 as exemplarily illustrated in FIG. 11. A screw 1102 comprising a slotted bead head 1102*a* is screwed onto the threaded hole 118*c* in the plunger 118. The slotted bead head 1102*a* comprises a V-shaped slot 1102*b* as exemplarily illustrated in FIG. 11. The spherical pin head 1101 at the distal end 112*d* of the second arm 112*b* of the plunger enhancer 112 hooks into the V-shaped slot 1102*b* of the slotted bead head 1102*a* of the screw 1102. In an embodiment, the screw 1102 is screwed onto the threaded hole 118*c* in the plunger 118 from either side, for example, the left side or the right side of the barrel 119. A downward pressure on the thumb stand 116 applies pressure on the plunger enhancer 112, and in turn, the plunger 118 in a downward direction. When the plunger 118 slides in a downward direction, the plunger enhancer 112 traverses each of the positions of the manual slider 114*a* or 114*b* one-by-one, thereby allowing a predetermined amount of fluid to be dispensed through the hollow prongs 124 of the multi-prong attachment 106. The thumb stand 116 applies pressure on the plunger enhancer 112 to descend through the positions of the manual slider 114*a* or 114*b*, one-by-one, until the plunger flange 110 is pushed completely down.

FIG. 12 exemplarily illustrates a left-hand side view of an embodiment of the infused grooming apparatus 100. The lock-fit groove 110*a* of the plunger flange 110 for securely fitting the plunger enhancer 112 is exemplarily illustrated in FIG. 12. Since the plunger enhancer 112 is detachable, the plunger enhancer 112 can be released or detached from the lock-fit groove 110*a* and repositioned or re-attached to suit a different hand orientation, for example, a left-hand orientation, a right-hand orientation, etc.

FIG. 13 exemplarily illustrates a rear elevation view of an embodiment of the infused grooming apparatus 100. Also shown in FIG. 13, are the manual sliders 114*a* and 114*b* positioned on the barrel 119 of the top member 102. The pair of handles 304*a* and 304*b* extending from the trailing end 102*c* of the top member 102 on opposing sides of the infused grooming apparatus 100 is also shown in FIG. 13.

Figure 14A:
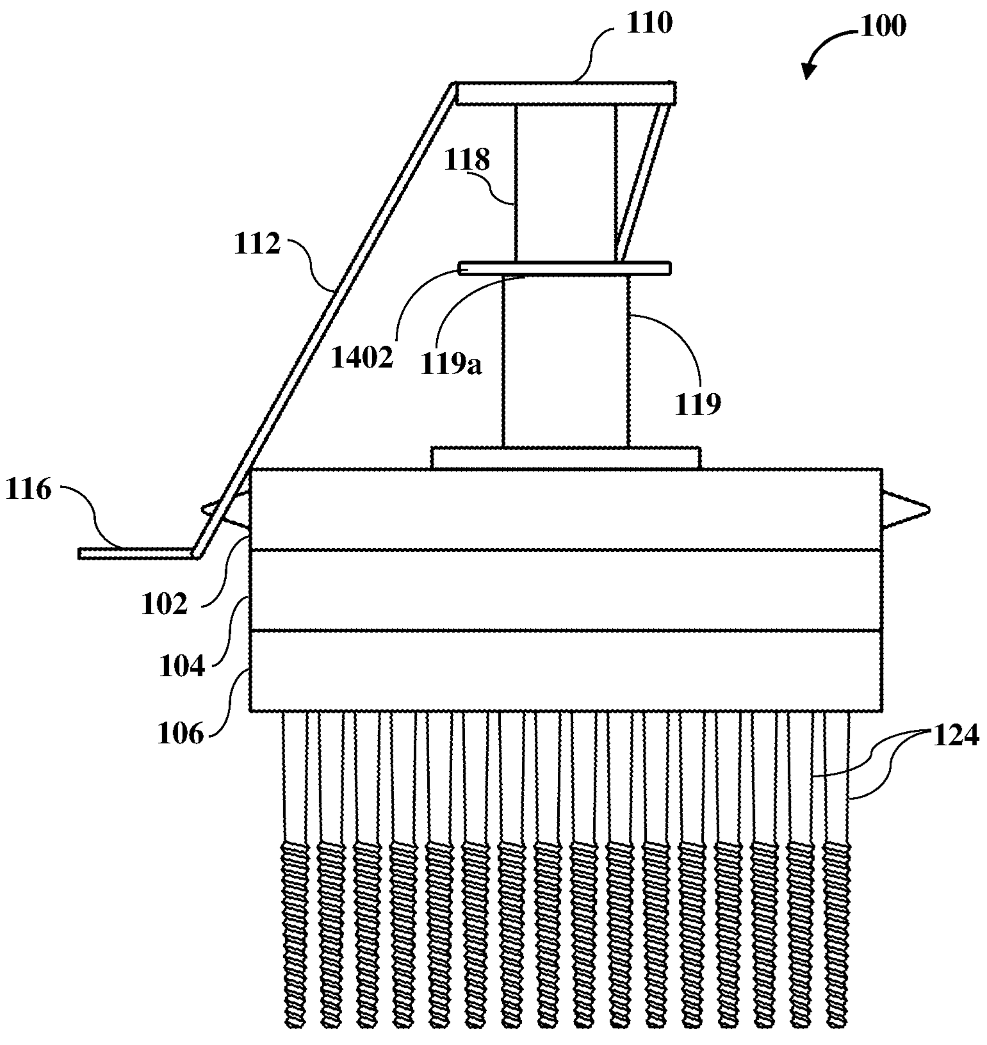
FIG. 14A exemplarily illustrates a front elevation view of another embodiment of the infused grooming apparatus comprising a barrel flange.
Figure 14B:
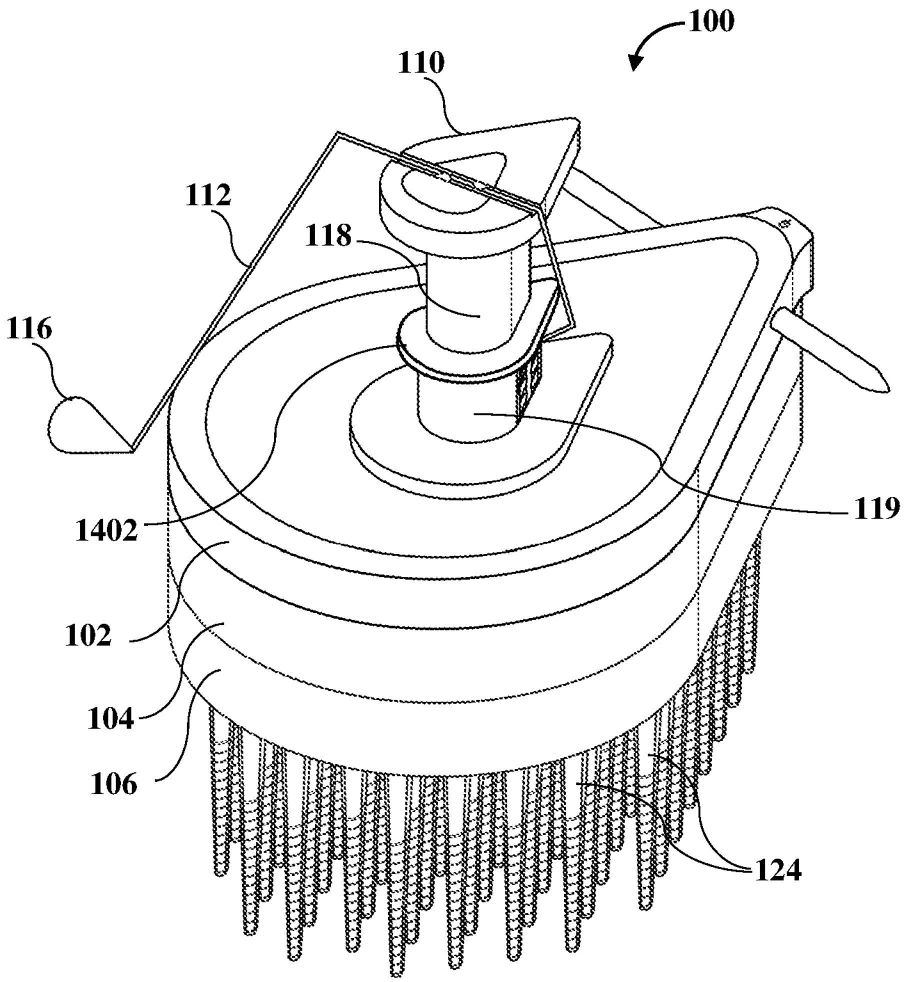
FIG. 14B exemplarily illustrates a front perspective view of another embodiment of the infused grooming apparatus comprising the barrel flange.

FIGS. 14A-14B exemplarily illustrate a front elevation view and a front perspective view respectively, of the infused grooming apparatus 100 comprising a barrel flange 1402. FIGS. 14A-14B show the top member 102 comprising the plunger 118 and the barrel 119; the plunger enhancer 112 with the thumb stand 116; the hollow chamber 104; and the multi-prong attachment 106 comprising the hollow prongs 124. In an embodiment, the barrel flange 1402 is disposed on a top end 119*a* of the barrel 119. The barrel flange 1402 allows a user to grip the infused grooming apparatus 100. The user may insert the barrel 119 between two of his/her fingers, for example, the index finger and the middle finger, and grip the infused grooming apparatus 100. In an embodiment, the barrel flange 1402 is teardrop shaped and extends horizontal to the top end 119*a* of the barrel 119, for example, by about 1 centimeter (cm) to about 3 centimeters. The length of extension of the barrel flange 1402 ensures that the width of fingers of the user comfortably fit underneath the barrel flange 1402 to grip the infused grooming apparatus 100.

In an embodiment, cross-sectional apertures of all the holes, distal ends, the plunger, etc., of the infused grooming apparatus 100 are teardrop shaped for optimal fluid dynamics. A wide teardrop shaped-hole or distal end provides more volume for dispensing fluids, for example, liquids, oils, moisturizers, etc., of higher densities and viscosities when compared to a conventional narrow syringe tip with a small circular hole. The material of the infused grooming apparatus 100 allows the infused grooming apparatus 100 to be used directly on the user's scalp and to come in contact with different types of hair without resulting in any damage to the scalp or the hair.

In various embodiments, suitable dimensions are selected for different parts of the infused grooming apparatus 100 for facilitating easy handling and daily use, while considering an average palm size and holding positions of the users. In an embodiment, the dimensions of the infused grooming apparatus 100 correspond to a length of, for example, about 3.5 inches to about 4.0 inches, and a width of, for example, about 3.0 inches to about 3.5 inches. In an embodiment, the thickness of the infused grooming apparatus 100 without the hollow prongs 124 is in a range of, for example, about 0.50 inches to about 0.75 inches. In an embodiment, the thickness of the infused grooming apparatus 100 with the hollow prongs 124 is in a range of, for example, about 0.50 inches to about 0.75 inches. The length of each of the hollow prongs 124 is, for example, about 1.5 cm to about 2.5 cm. It may be noted by those skilled in the art that the length, the width, and the thickness of different parts of the infused grooming apparatus 100 is customizable to suit specific end-user requirements, for example, a large palm size, without departing from the scope of the embodiments herein.

The foregoing examples and illustrative implementations of various embodiments of the infused grooming apparatus 100 have been provided merely for explanation and are in no way to be construed as limiting of the embodiments disclosed herein. Dimensions of the parts of the infused grooming apparatus 100 disclosed above are exemplary and are not limiting of the scope of the embodiments herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods, and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

I claim:

1. A grooming apparatus comprising:

a top member comprising a barrel and a plunger, wherein the plunger is configured to slide in the barrel;

a hollow chamber in fluid connection with the barrel of the top member, wherein the hollow chamber is configured to contain a fluid, and wherein the plunger of the top member is configured to exert a pressure on the fluid contained in the hollow chamber, the hollow chamber comprising a plurality of tubular members disposed on and projecting outwards from a bottom surface of the hollow chamber; and a multi-prong attachment comprising a top surface and a bottom surface, the top surface comprising a plurality of holes configured to receive the plurality of tubular members of the hollow chamber, and the bottom surface comprising a plurality of hollow prongs, wherein each of the plurality of hollow prongs extends downwards from one of the holes in the top surface of the multi-prong attachment, wherein the plurality of hollow prongs is configured to accommodate the plurality of tubular members therewithin, wherein each of the plurality of hollow prongs comprises screw ridges configured on an outer surface towards a distal end of each of the plurality of hollow prongs, wherein the screw ridges on each of the plurality of hollow prongs are configured to secure a covering element over each of the plurality of hollow prongs and the distal end of each of the plurality of hollow prongs.

2. The grooming apparatus of claim 1, wherein a bottom surface of the top member comprises a male luer lock connecter in fluid connection with the barrel, and wherein a top surface of the hollow chamber comprises a female luer lock connector in fluid connection with an internal volume defined by the hollow chamber, and wherein the male luer lock connecter is configured to engage with the female luer lock connector to attach the top member to the hollow chamber.

3. The grooming apparatus of claim 1, further comprising a plunger enhancer comprising a first arm and a second arm, wherein the plunger enhancer is configured to convert a downward movement of one or more of the first arm and the second arm to a downward movement of the plunger for releasing the fluid from the barrel.

4. The grooming apparatus of claim 3, further comprising a plunger flange coupled to the plunger, wherein the plunger flange comprises a lock-fit groove configured to lock-fit the plunger enhancer.

5. The grooming apparatus of claim 3, wherein the first arm of the plunger enhancer comprises a thumb stand disposed at a distal end of the first arm, wherein the thumb stand is configured to accommodate a thumb of a user, and wherein the thumb stand is configured to transfer a downward pressure applied by the thumb on the thumb stand to the plunger enhancer and in turn to the plunger.

6. The grooming apparatus of claim 5, wherein a shape of the thumb stand is a teardrop shape.

7. The grooming apparatus of claim 3, wherein the second arm of the plunger enhancer is slidably coupled to a manual slider at a distal end of the second arm.

8. The grooming apparatus of claim 7, wherein the manual slider comprises a predetermined number of slidable positions traversable by the second arm of the plunger enhancer when a downward force acts on the first arm of the plunger enhancer.

9. The grooming apparatus of claim 1, wherein a shape of the top member is a flat teardrop shape, wherein the top member further comprises:

a pair of handles, wherein each of the pair of handles extends from a trailing end of the top member, and wherein a first handle of the pair of handles is disposed diametrically opposite to and away from a second handle of the pair of handles; and a compartment disposed between the pair of handles at the trailing end of the top member, wherein the compartment is configured to house a vibration unit, and wherein the trailing end of the top member comprises a switch configured to operate the vibration unit.

10. The grooming apparatus of claim 9, wherein the vibration unit comprises a battery-powered vibrator configured to generate vibrations of predetermined intensities.

11. The grooming apparatus of claim 1, wherein a shape of the barrel is a teardrop shape, and wherein a cross-section of the plunger across a length of the plunger is of a teardrop shape.

12. The grooming apparatus of claim 1, wherein a shape of the multi-prong attachment is a teardrop shape.

13. The grooming apparatus of claim 1, wherein a shape of a tip of each of the plurality of hollow prongs is a teardrop shape.

14. The grooming apparatus of claim 1, wherein a cross-section of each of the plurality of hollow prongs across a length of each of the plurality of hollow prongs is of a teardrop shape.

15. The grooming apparatus of claim 1, further comprising a holding tray configured to store a fluid, wherein a shape of the holding tray is a teardrop shape, and wherein the holding tray comprises a plurality of holes configured on a top surface of the holding tray for receiving the plurality of hollow prongs of the multi-prong attachment and facilitating intake of the stored fluid through the plurality of hollow prongs.

16. The grooming apparatus of claim 1, wherein the fluid comprises one of oil, water, shampoo, conditioner, hair serum, hair care products, and any combination thereof.

17. The grooming apparatus of claim 1, wherein the plurality of tubular members and hollow prongs have a generally cylindrical hollow shape.

18. A grooming apparatus comprising:

a first layer comprising a multi-prong attachment, the multi-prong attachment comprising a top surface and a bottom surface, the top surface comprising a plurality of holes configured to receive a plurality of tubular members, and the bottom surface comprising a plurality of hollow prongs, wherein each of the plurality of hollow prongs extends downwards from one of the holes in the top surface of the multi-prong attachment, and wherein the plurality of hollow prongs is configured to accommodate the plurality of tubular members therewithin, wherein each of the plurality of hollow prongs comprises screw ridges configured on an outer surface towards a distal end of each of the plurality of hollow prongs, wherein the screw ridges on each of the plurality of hollow prongs are configured to secure a covering element over each of the plurality of hollow prongs and the distal end of each of the plurality of hollow prongs;

a second layer comprising a hollow chamber, the hollow chamber comprising the plurality of tubular members disposed on and projecting outwards from a bottom surface of the hollow chamber, wherein the hollow chamber is configured to contain a fluid, and wherein a top surface of the hollow chamber comprises a female luer lock connector in fluid connection with an internal volume defined by the hollow chamber; and a third layer comprising a top member, the top member comprising a barrel and a plunger, wherein the plunger is configured to slide in the barrel, and wherein the plunger is configured to exert a pressure on the fluid contained in the hollow chamber, and wherein a bottom surface of the top member comprises a male luer lock connecter in fluid connection with the barrel, and wherein the male luer lock connecter is configured to engage with the female luer lock connector on the hollow chamber to attach the top member to the hollow chamber.

19. The grooming apparatus of claim 18, wherein the fluid comprises one of oil, water, shampoo, conditioner, hair serum, hair care products, and any combination thereof.

20. The grooming apparatus of claim 18, wherein the third layer further comprises a plunger enhancer comprising a first arm and a second arm, wherein the plunger enhancer is configured to convert a downward movement of one or more of the first arm and the second arm to a downward movement of the plunger for releasing the fluid from the barrel.

* * * * *